(12) United States Patent
Nakayama et al.

(10) Patent No.: US 8,660,417 B2
(45) Date of Patent: Feb. 25, 2014

(54) DRIVE MOTOR, IMAGE BLUR CORRECTION UNIT, AND IMAGING APPARATUS

(71) Applicant: Sony Corporation, Tokyo (JP)

(72) Inventors: Tatsuyuki Nakayama, Kanagawa (JP); Keishi Kobayashi, Kanagawa (JP); Takumi Fukuda, Tokyo (JP); Kazuhiro Hattori, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/755,933

(22) Filed: Jan. 31, 2013

(65) Prior Publication Data

US 2013/0223829 A1 Aug. 29, 2013

(30) Foreign Application Priority Data

Feb. 29, 2012 (JP) ................................. 2012-044278

(51) Int. Cl.
*G03B 17/00* (2006.01)
*H02K 7/08* (2006.01)

(52) U.S. Cl.
USPC ............................... 396/55; 310/90; 310/268

(58) Field of Classification Search
USPC ........................................... 396/55, 427, 428
See application file for complete search history.

(56) References Cited

U.S. PATENT DOCUMENTS

| 4,620,252 | A  | * | 10/1986 | Bauck et al. | 360/265 |
|---|---|---|---|---|---|
| 5,907,730 | A  | * | 5/1999 | Tseng et al. | 396/428 |
| 6,400,902 | B1 | * | 6/2002 | Usui | 396/55 |
| 2003/0142973 | A1 | * | 7/2003 | Sawada | 396/427 |
| 2006/0125342 | A1 | * | 6/2006 | Mossner et al. | 310/254 |
| 2013/0177301 | A1 | * | 7/2013 | Nakayama et al. | 396/55 |
| 2013/0223829 | A1 | * | 8/2013 | Nakayama et al. | 396/55 |

FOREIGN PATENT DOCUMENTS

| JP | 7-274056 A | 10/1995 |
|---|---|---|
| JP | 08-147812 A | 6/1996 |

* cited by examiner

*Primary Examiner* — W B Perkey
(74) *Attorney, Agent, or Firm* — Rader, Fishman & Grauer PLLC

(57) ABSTRACT

A drive motor includes: an output shaft provided as an axis of rotation; a first attachment plate having a first fixing hole; a second attachment plate having a second fixing hole and located in a position separate from the first attachment plate in an axial direction of the output shaft; a magnet attached to one surface of the first attachment plate; a coil attached to one surface of the second attachment plate and facing the magnet; a first shaft holding member that is inserted into the first fixing hole and fixed to the first attachment plate and holds the output shaft; and a second shaft holding member that is inserted into the second fixing hole and fixed to the second attachment plate and holds the output shaft.

10 Claims, 23 Drawing Sheets

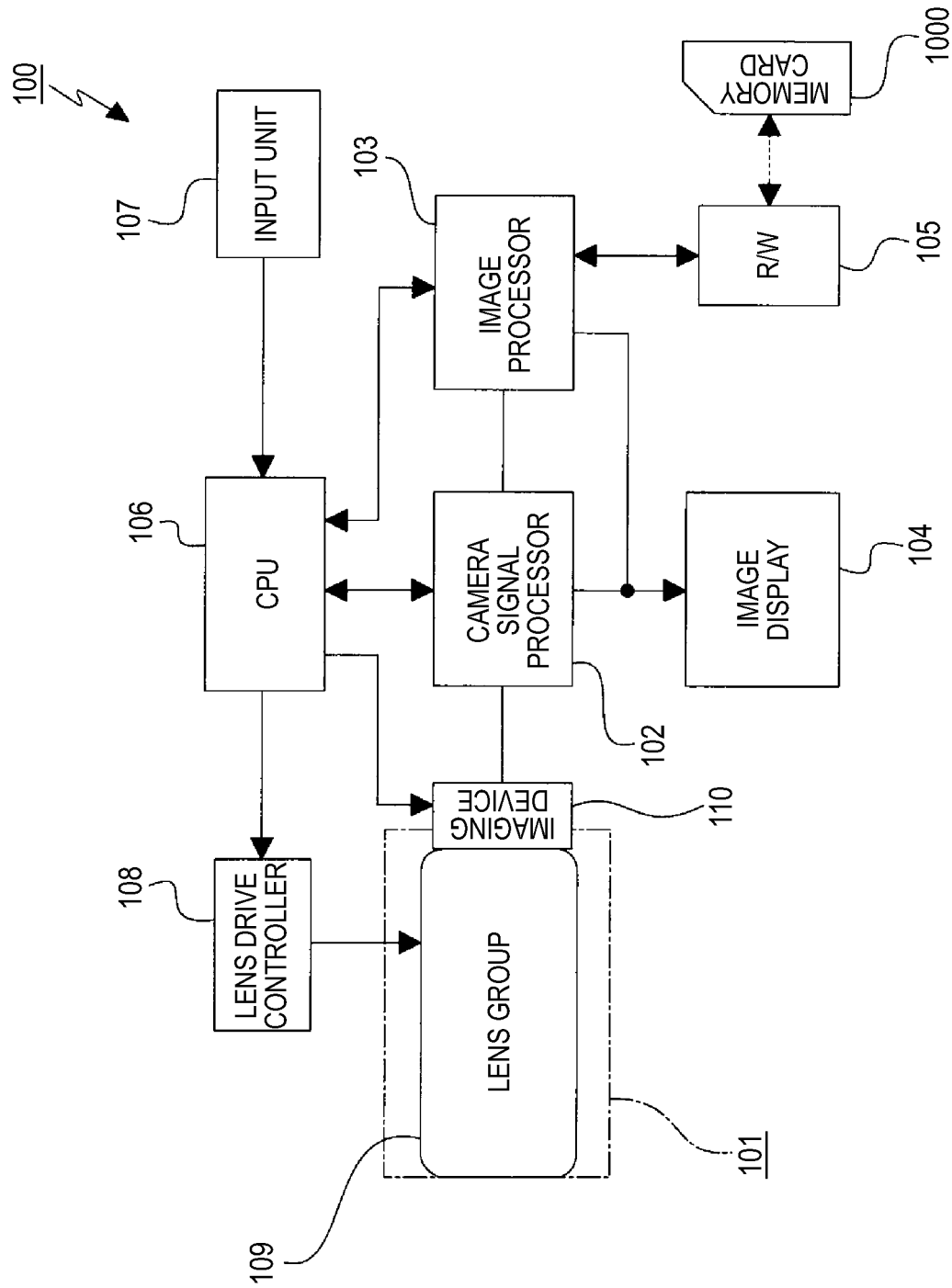

DRIVE MOTOR, IMAGE BLUR CORRECTION UNIT, AND IMAGING APPARATUS

FIELD

The present technology relates to a technical field of a drive motor, an image blur correction unit, and an imaging apparatus, and particularly to a technical field of improvement in strength and drive force associated with a drive motor and two shaft holding members that hold the output shaft of the drive motor by providing a caulking portion of each of the shaft holding members on the side where no magnet or coil is disposed.

BACKGROUND

Electronic apparatus include various types of apparatus, such as video camcorders, still cameras, and other imaging apparatus; recording medium drive apparatus that record information onto a recording medium and reproduce information from a recording medium; television receivers and other display apparatus that display images and videos; personal computers and other information processing apparatus that process various types of information; and mobile phones and other communication apparatus that perform communication and other types of operation.

Some of the electronic apparatus described above include a drive motor that has a magnet and a coil and rotates a shaft by using a thrust force generated between the magnet and the coil when current flows through the coil.

For example, in some video camcorders, still cameras, and other imaging apparatus, a drive motor is provided in an image blur correction unit that moves a lens or any other optical element in a direction perpendicular to the optical axis to correct an image blur.

The image blur correction unit provided in any of the imaging apparatus described above includes a lens unit including lenses and pivotable in the following two directions: a first direction around a first pivotal axis perpendicular to the optical axis of the lenses and a second direction around a second pivotal axis perpendicular to the optical axis and the first pivotal axis (see JP-A-7-274056, for example).

Further, for example, in some recording medium drive apparatus that record information onto a tape-shaped recording medium and reproduce information from the recording medium, a drive motor is used to rotate a capstan that, along with a pinch roller, forwards the tape-shaped recording medium (see JP-A-8-147812, for example).

The drive motor described in JP-A-8-147812 is a thin, flat-shaped motor having magnets and coils attached to a pair of attachment plates with the magnets and the coils facing each other, and a pair of shaft holding members that hold an output shaft (capstan) along the axial direction thereof are fixed to central portions of the pair of attachment plates.

Each of the shaft holding members has a flange portion overhanging outward in the radial direction and is inserted into the central portion of the corresponding attachment plate. The end portion of the shaft holding member that is located on the opposite side to the side where the flange portion is provided is deformed in a caulking process to form a caulking portion. The shaft holding member is fixed to the attachment plate with the flange portion and the caulking portion pressing an inner circumferential portion of the attachment plate from opposite sides.

SUMMARY

In the drive motor described above, however, the magnets and the coils are attached to the surfaces of the attachment plates that face each other (inner surfaces), and the magnetic force (attractive force) of the magnets produces a force in the direction in which the two attachment plates approach each other. In this case, the attachment plates are disadvantageously inclined to each other when the strengths at which the shaft holding members are fixed to the attachment plates are not large enough.

When the attachment plates are inclined to each other, the drive motor may malfunction, for example, the output shaft of the drive motor may not rotate smoothly or the drive force of the drive motor may decrease.

It is therefore desirable to provide a drive motor, an image blur correction unit, and an imaging apparatus that solve the problem described above and provide improvement in the strength and the drive force.

An embodiment of the present technology is directed to a drive motor including an output shaft provided as an axis of rotation, a first attachment plate having a first fixing hole, a second attachment plate having a second fixing hole and located in a position separate from the first attachment plate in an axial direction of the output shaft, a magnet attached to one surface of the first attachment plate, a coil attached to one surface of the second attachment plate and facing the magnet, a first shaft holding member that is inserted into the first fixing hole and fixed to the first attachment plate and holds the output shaft, and a second shaft holding member that is inserted into the second fixing hole and fixed to the second attachment plate and holds the output shaft, wherein each of the first shaft holding member and the second shaft holding member is provided with a flange portion that presses an inner circumferential portion of the one surface of the corresponding one of the first attachment plate and the second attachment plate and a caulking portion that is formed in a caulking process and presses an inner circumferential portion of the other surface of the corresponding one of the first attachment plate and the second attachment plate.

In the drive motor described above, the flange portions of the shaft holding members provide forces pressing the attachment plates, to which forces in the direction in which the attachment plates approach each other are applied, in the direction against the forces in the direction in which the attachment plates approach each other.

In the drive motor described above, it is preferable that an attachment surface portion to which at least one of the first attachment plate and the second attachment plate is so attached that the other surface is in contact with the attachment surface portion is provided, and that the attachment surface portion has an insertion hole in which the caulking portion of the corresponding one of the first shaft holding member and the second shaft holding member is inserted and disposed.

When an attachment surface portion to which at least one of the first attachment plate and the second attachment plate is so attached that the other surface is in contact with the attachment surface portion is provided, and the attachment surface portion has an insertion hole in which the caulking portion of the corresponding one of the first shaft holding member and the second shaft holding member is inserted and disposed, the size of the insertion hole is reduced, and a leakage magnetic flux in the drive motor that passes through the insertion holes decreases accordingly.

In the drive motor described above, it is preferable that the attachment surface portion is provided as a yoke.

Since the attachment surface portion is provided as a yoke, the leakage magnetic flux in the drive motor decreases.

In the drive motor described above, it is preferable that a rib protruding in the axial direction is provided on at least one of the flange portions.

When a rib protruding in the axial direction is provided on at least one of the flange portions, the shaft holding member is fixed to the corresponding attachment plate at a greater strength.

In the drive motor described above, it is preferable that at least a front end portion of the rib provided on at least one of the first shaft holding member and the second shaft holding member and part of the second shaft holding member or the first shaft holding member are located side by side in a direction perpendicular to the axial direction.

When at least a front end portion of the rib provided on at least one of the first shaft holding member and the second shaft holding member and part of the second shaft holding member or the first shaft holding member are located side by side in a direction perpendicular to the axial direction, the shaft holding member is fixed to the corresponding attachment plate at a greater strength.

In the drive motor described above, it is preferable that the outer diameter of the flange portion of the first shaft holding member is set to be greater than the outer diameter of the flange portion of the second shaft holding member.

When the outer diameter of the flange portion of the first shaft holding member is set to be greater than the outer diameter of the flange portion of the second shaft holding member, the first shaft holding member is fixed to the first attachment plate at a greater strength than the second shaft holding member is fixed to the second attachment plate.

In the drive motor described above, it is preferable that an outer circumferential portion of the flange portion of the first shaft holding member and part of the coil are located side by side in the axial direction.

In the drive motor described above, it is preferable that the outer diameter of each of the flange portions is set to be greater than the outer diameter of the corresponding one of the caulking portions.

When the outer diameter of each of the flange portions is set to be greater than the outer diameter of the corresponding one of the caulking portions, forces that press the attachment plates, to which forces in the direction in which the attachment plates approach each other are applied, in the direction against the forces acting in the direction in which the attachment plates approach each other increase.

When an outer circumferential portion of the flange portion of the first shaft holding member and part of the coil are located side by side in the axial direction, the first shaft holding member is fixed to the first attachment plate at a greater strength than the second shaft holding member is fixed to the second attachment plate.

Another embodiment of the present technology is directed to an image blur correction unit including a lens unit having at least one lens and pivotable relative to an exterior enclosure in two directions perpendicular not only to an optical axis of the lens but also to each other and a drive motor that causes the lens unit to pivot, wherein the drive motor includes an output shaft provided as an axis of rotation, a first attachment plate having a first fixing hole, a second attachment plate having a second fixing hole and located in a position separate from the first attachment plate in an axial direction of the output shaft, a magnet attached to one surface of the first attachment plate, a coil attached to one surface of the second attachment plate and facing the magnet, a first shaft holding member that is inserted into the first fixing hole and fixed to the first attachment plate and holds the output shaft, and a second shaft holding member that is inserted into the second fixing hole and fixed to the second attachment plate and holds the output shaft, and each of the first shaft holding member and the second shaft holding member is provided with a flange portion that presses an inner circumferential portion of the one surface of the corresponding one of the first attachment plate and the second attachment plate and a caulking portion that is formed in a caulking process and presses an inner circumferential portion of the other surface of the corresponding one of the first attachment plate and the second attachment plate.

In the image blur correction unit described above, the flange portions of the shaft holding members provide forces pressing the attachment plates, to which forces in the direction in which the attachment plates approach each other in the drive motor are applied, in the direction against the forces in the direction in which the attachment plates approach each other.

Still another embodiment of the present technology is directed to an imaging apparatus including an image blur correction unit having a lens unit that has at least one lens and an exterior enclosure that accommodates the lens unit, corrects an image blur by using the lens unit that is pivotable relative to the exterior enclosure in two directions perpendicular not only to an optical axis of the lens but also to each other, and has a drive motor that causes the lens unit to pivot, wherein the drive motor includes an output shaft provided as an axis of rotation, a first attachment plate having a first fixing hole, a second attachment plate having a second fixing hole and located in a position separate from the first attachment plate in an axial direction of the output shaft, a magnet attached to one surface of the first attachment plate, a coil attached to one surface of the second attachment plate and facing the magnet, a first shaft holding member that is inserted into the first fixing hole and fixed to the first attachment plate and holds the output shaft, and a second shaft holding member that is inserted into the second fixing hole and fixed to the second attachment plate and holds the output shaft, and each of the first shaft holding member and the second shaft holding member is provided with a flange portion that presses an inner circumferential portion of the one surface of the corresponding one of the first attachment plate and the second attachment plate and a caulking portion that is formed in a caulking process and presses an inner circumferential portion of the other surface of the corresponding one of the first attachment plate and the second attachment plate.

In the imaging apparatus described above, the flange portions of the shaft holding members provide forces pressing the attachment plates, to which forces in the direction in which the attachment plates approach each other in the drive motor are applied, in the direction against the forces in the direction in which the attachment plates approach each other.

The drive motor according to the embodiment of the present technology includes the output shaft provided as the axis of rotation, the first attachment plate having the first fixing hole, the second attachment plate having the second fixing hole and located in the position separate from the first attachment plate in the axial direction of the output shaft, the magnet attached to one surface of the first attachment plate, the coil attached to one surface of the second attachment plate and facing the magnet, the first shaft holding member that is inserted into the first fixing hole and fixed to the first attachment plate and holds the output shaft, and the second shaft holding member that is inserted into the second fixing hole and fixed to the second attachment plate and holds the output shaft. Each of the first shaft holding member and the second shaft holding member is provided with a flange portion that presses an inner circumferential portion of the one surface of the corresponding one of the first attachment plate and the second attachment plate and a caulking portion that is formed in a caulking process and presses an inner circumferential portion of the other surface of the corresponding one of the first attachment plate and the second attachment plate.

The configuration described above increases forces against the magnetic force produced by the magnet and acting in the direction in which the first attachment plate and the second attachment plate approach each other, whereby the strengths of the first shaft holding member and the second shaft holding member and hence the drive force of the drive motor can be improved.

In the drive motor according to a preferred embodiment of the present technology described above, the attachment surface portion to which at least one of the first attachment plate and the second attachment plate is so attached that the other surface is in contact with the attachment surface portion is provided, and the attachment surface portion has the insertion hole in which the caulking portion of the corresponding one of the first shaft holding member and the second shaft holding member is inserted and disposed.

The size of the insertion hole can therefore be minimized, and a leakage magnetic flux in the drive motor that passes through the insertion hole decreases accordingly, whereby the drive force of the drive motor can be improved.

In the drive motor according to another preferred embodiment of the present technology described above, the attachment surface portion is provided as a yoke.

The leakage magnetic flux in the drive motor therefore decreases, whereby the drive force of the drive motor can be further improved.

Further, since the attachment surface portion is provided as a yoke, each of the first and second attachment plates can be thinner than in a case where the yoke is formed only of the first or second attachment plate, whereby the size of the drive motor can be reduced.

In the drive motor according to still another preferred embodiment of the present technology described above, the rib protruding in the axial direction is provided on at least one of the flange portions.

The corresponding shaft holding member can therefore be fixed to the attachment plate at a greater strength, whereby inclination of the corresponding attachment plate resulting from the magnetic force of the magnet is prevented, and the drive force of the drive motor can be improved.

In the drive motor according to yet another preferred embodiment of the present technology described above, at least the front end portion of the rib provided on at least one of the first shaft holding member and the second shaft holding member and part of the second shaft holding member or the first shaft holding member are located side by side in the direction perpendicular to the axial direction.

The configuration described above prevents inclination of the corresponding attachment plate resulting from the magnetic force of the magnet, and the drive force of the drive motor can be improved.

Further, the rib and the corresponding shaft holding member are located side by side in the direction perpendicular to the axial direction, which reduces the amount of dust entering the interior over the rib, whereby rotational operation of the drive motor will not be degraded even in a dust-prone environment, and excellent performance of the drive motor can be maintained.

In the drive motor according to still yet another preferred embodiment of the present technology described above, the outer diameter of the flange portion of the first shaft holding member is set to be greater than the outer diameter of the flange portion of the second shaft holding member.

As a result, the space between the first attachment plate and the second attachment plate can be effectively used, whereby the strength of the first shaft holding member can be improved while the size reduction of the drive motor resulting from the effective use of the space is achieved at the same time.

In the drive motor according to further another preferred embodiment of the present technology described above, the outer circumferential portion of the flange portion of the first shaft holding member and part of the coil are located side by side in the axial direction.

As a result, the space between the first attachment plate and the second attachment plate can be used as much as possible, whereby the strengths of the first and second shaft holding members can be further improved while the size reduction of the drive motor resulting from the effective use of the space is achieved at the same time.

In the drive motor according to still further another preferred embodiment of the present technology described above, the outer diameter of each of the flange portions is set to be greater than the outer diameter of the corresponding one of the caulking portions.

When the outer diameter of each of the flange portions is set to be greater than the outer diameter of the corresponding one of the caulking portions, forces that press the attachment plates, to which forces in the direction in which the attachment plates approach each other are applied, in the direction against the forces acting in the direction in which the attachment plates approach each other increase, whereby the strengths of the first and second shaft holding members can be improved.

The image blur correction unit according to the another embodiment of the present technology includes the lens unit having at least one lens and pivotable relative to the exterior enclosure in two directions perpendicular not only to the optical axis of the lens but also to each other and the drive motor that causes the lens unit to pivot. The drive motor includes the output shaft provided as the axis of rotation, the first attachment plate having a first fixing hole, the second attachment plate having a second fixing hole and located in the position separate from the first attachment plate in the axial direction of the output shaft, the magnet attached to one surface of the first attachment plate, the coil attached to one surface of the second attachment plate and facing the magnet, the first shaft holding member that is inserted into the first fixing hole and fixed to the first attachment plate and holds the output shaft, and the second shaft holding member that is inserted into the second fixing hole and fixed to the second attachment plate and holds the output shaft. Each of the first shaft holding member and the second shaft holding member is provided with the flange portion that presses an inner circumferential portion of the one surface of the corresponding one of the first attachment plate and the second attachment plate and the caulking portion that is formed in the caulking process and presses the inner circumferential portion of the other surface of the corresponding one of the first attachment plate and the second attachment plate.

The configuration described above increases forces against the magnetic force produced by the magnet and acting in the direction in which the first attachment plate and the second attachment plate approach each other, whereby the strengths of the first shaft holding member and the second shaft holding member and hence the drive force of the drive motor can be improved.

The imaging apparatus according to the still another embodiment of the present technology includes the image blur correction unit having the lens unit that has at least one lens and an exterior enclosure that accommodates the lens unit, corrects the image blur by using the lens unit that is pivotable relative to the exterior enclosure in two directions perpendicular not only to the optical axis of the lens but also to each other, and has the drive motor that causes the lens unit to pivot. The drive motor includes the output shaft provided as the axis of rotation, the first attachment plate having the first fixing hole, the second attachment plate having the second fixing hole and located in the position separate from the first attachment plate in an axial direction of the output shaft, the magnet attached to one surface of the first attachment plate, the coil attached to one surface of the second attachment plate and facing the magnet, the first shaft holding member that is inserted into the first fixing hole and fixed to the first attachment plate and holds the output shaft, and the second shaft holding member that is inserted into the second fixing hole and fixed to the second attachment plate and holds the output shaft. Each of the first shaft holding member and the second shaft holding member is provided with the flange portion that presses the inner circumferential portion of the one surface of the corresponding one of the first attachment plate and the second attachment plate and the caulking portion that is formed in the caulking process and presses an inner circumferential portion of the other surface of the corresponding one of the first attachment plate and the second attachment plate.

The configuration described above increases forces against the magnetic force produced by the magnet and acting in the direction in which the first attachment plate and the second attachment plate approach each other, whereby the strengths of the first shaft holding member and the second shaft holding member and hence the drive force of the drive motor can be improved.

BRIEF DESCRIPTION OF THE DRAWINGS

FIG. 24 is a block diagram of the imaging apparatus.

DETAILED DESCRIPTION

Modes for providing a drive motor, an image blur correction unit, and an imaging apparatus according to embodiments of the present technology will be described below with reference to the accompanying drawings.

In the best mode described below, an imaging apparatus according to an embodiment of the present technology is implemented as a video camcorder, an image blur correction unit according to another embodiment of the present technology is implemented as an image blur correction unit provided in the video camcorder, and a drive motor according to another embodiment of the present technology is implemented as a drive motor provided in the image blur correction unit.

It is noted that an imaging apparatus, an image blur correction apparatus, and a drive motor according to embodiments of the present technology are not necessarily implemented as a video camcorder, an image blur correction unit provided in the video camcorder, and a drive motor provided in the image blur correction unit. A drive motor according to an embodiment of the present technology can be widely used as a variety of drive motors having a configuration in which magnets and coils are so disposed on respective two attachment plates that the magnets and the coils face each other and two shaft holding members that hold an output shaft are fixed to the respective attachment plates, and an imaging apparatus and an image blur correction unit according to embodiments of the present technology can be used as a variety of imaging apparatus and image blur correction units provided with the drive motor.

In the following description, the front-rear, up-down, and right-left directions are defined relative to a user who uses the video camcorder to capture an image. That is, the subject side is the front side, and the camera user side is the rear side.

The front-rear, up-down, and right-left directions used below are defined for ease of description and do not impose any limitation on implementation of the present technology.

A lens described below may be formed of a single lens or a lens group including a plurality of lenses.

[Overall Configuration of Imaging Apparatus]

Figure 1:
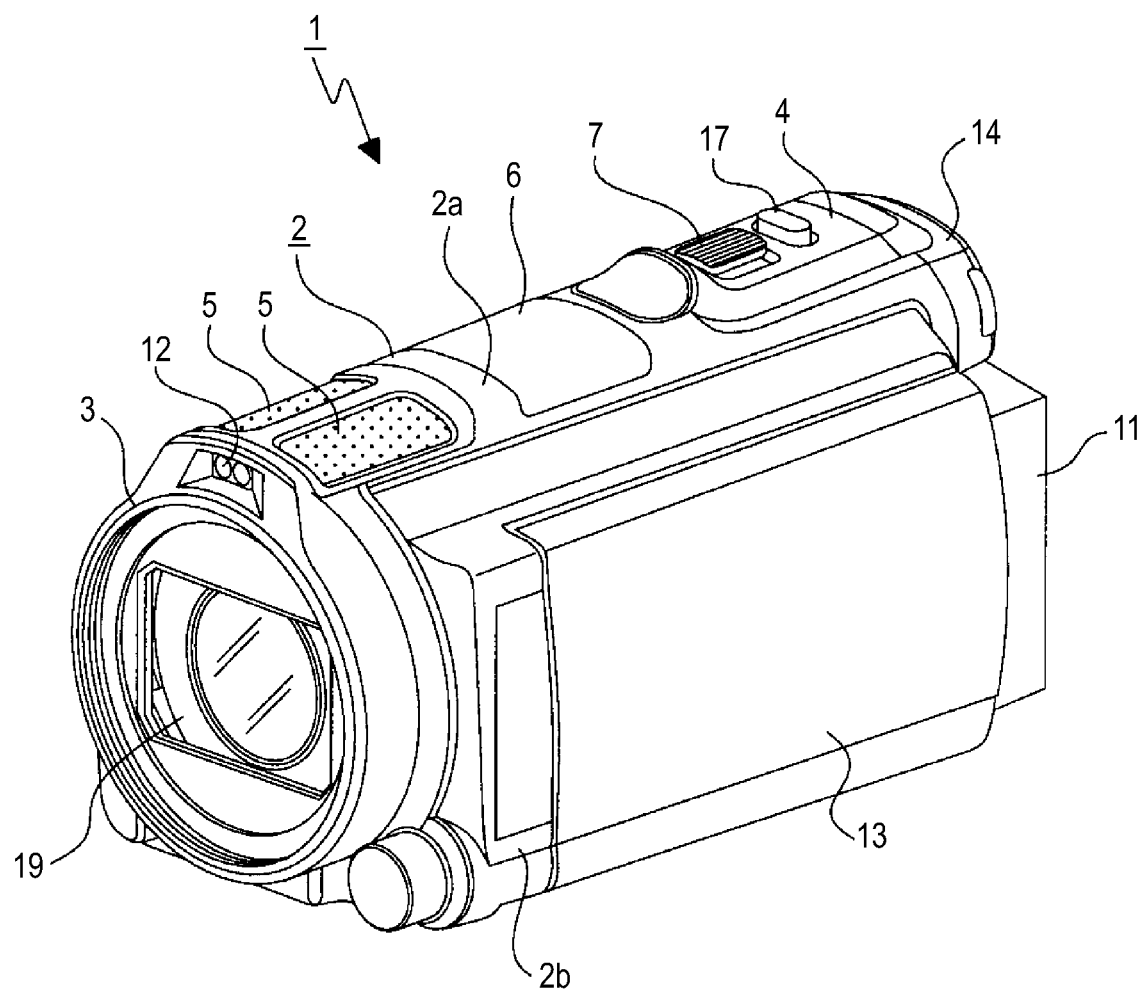
FIG. 1, along with FIGS. 2 to 24, shows an imaging apparatus according an embodiment the present technology and is a perspective view of the imaging apparatus.
Figure 2:
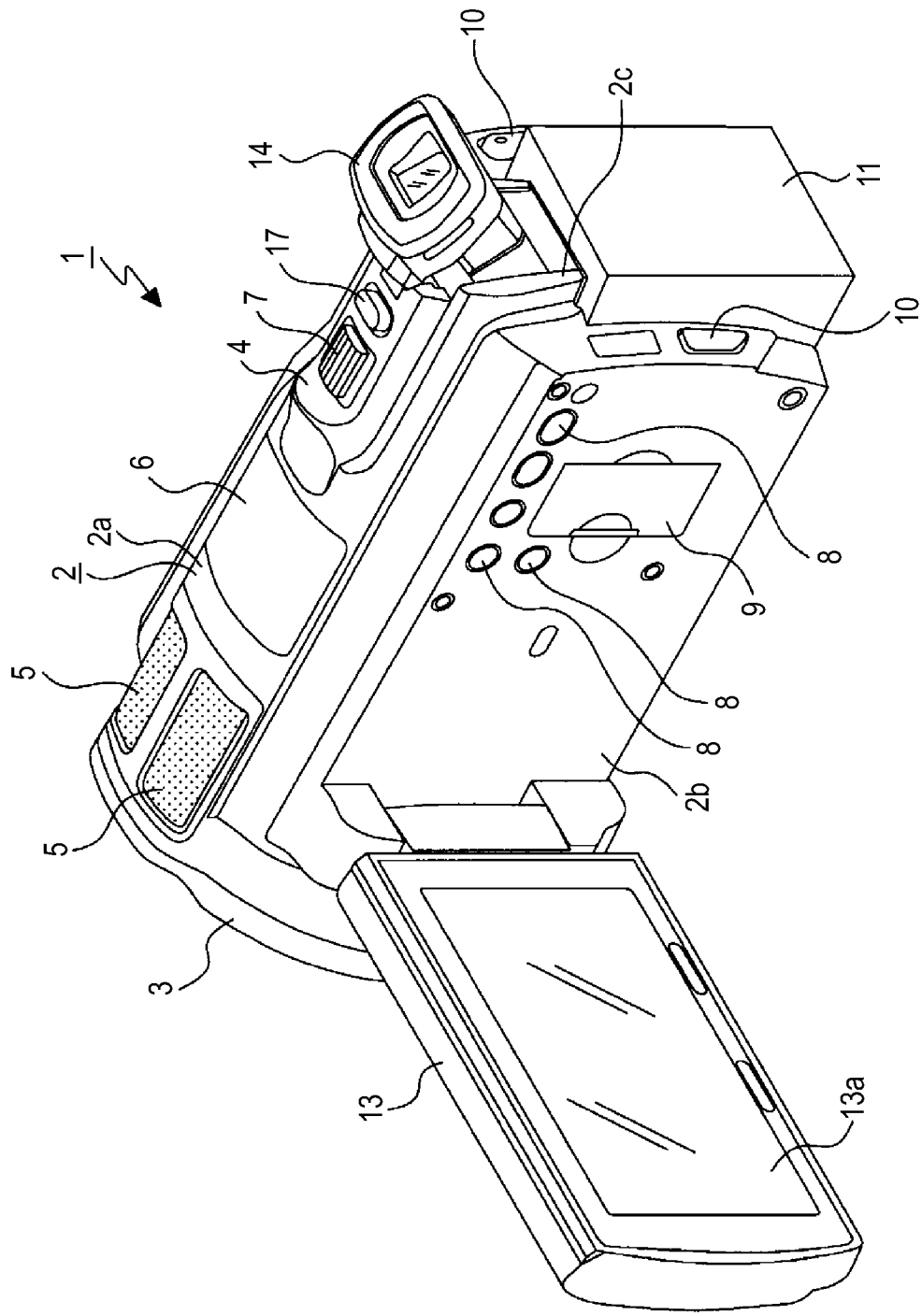
FIG. 2 is a perspective view of the imaging apparatus viewed in a direction different from the viewing direction in FIG. 1.

An imaging apparatus 1 has necessary components disposed inside and outside an exterior enclosure 2 (see FIGS. 1 and 2). The exterior enclosure 2, for example, has a case-like shape elongated in the front-rear direction and having a front end portion provided as a front panel portion 3 and a rear end portion having an upper end portion provided as an accommodation case portion 4 that opens rearward.

On an upper surface 2a of the exterior enclosure 2 are disposed microphones 5, 5, an interface cover 6, and operation switches 7, 7 in this order from the front. The operation switches 7, 7 are, for example, a zoom lever and an imaging button.

On one side surface 2b of the exterior enclosure 2 are disposed a variety of operation buttons 8, 8, . . . , such as a power button and an image reproducing button. A memory card 9 is loaded into the one side surface 2b of the exterior enclosure 2.

On a rear surface 2c of the exterior enclosure 2 are disposed operation buttons 10, 10, such as a mode switching button and a recording button.

A battery 11 is loaded into the rear surface of the exterior enclosure 2, and part of the battery 11 protrudes rearward from the rear surface 2c of the exterior enclosure 2.

A flashlight 12 is disposed in an upper end portion of the front panel portion 3. The flashlight 12 is used, for example, in nighttime imaging and outputs auxiliary light forward.

A display section 13 is pivotally and rotatably connected to a side surface portion of the exterior enclosure 2. The display section 13 has a front end portion connected to the exterior enclosure 2 and has a display surface 13a.

A finder 14 is connected to a rear end portion of the imaging apparatus 1. The finder 14 is slidable relative to the accommodation case portion 4 in the front-rear direction and pivotable relative thereto in the tilt direction.

The finder 14 is slidable between a retracted position where a portion of the finder 14 except a rear end portion is retracted into the accommodation case portion 4 and an extended position where the retracted portion is extended out of the accommodation case portion 4. Further, the finder 14, when it is in the extended position, is pivotable in the tilt direction around a front end portion of the finder 14.

[Configuration of Image Blur Correction Unit]

An image blur correction unit 15 is disposed in the exterior enclosure 2 (see FIGS. 3 to 8). The image blur correction unit 15 includes an outer frame 16, an inner frame 17, a holding frame 18, and a lens unit 19.

The outer frame 16 is formed of a first member 20 and a second member 21 connected to each other.

The first member 20 is formed of an attachment surface portion 22 having one surface facing upward and the other surface facing downward and a side surface portion 23 having one surface facing rightward and the other surface facing leftward, and the right end of the attachment surface portion 22 is aligned with and connected to the upper end of the side surface portion 23. An insertion hole 22a is formed through a central portion of the attachment surface portion 22. The attachment surface portion 22 functions not only as part of a frame to which part of a first drive motor, which will be described later, is attached but also as a yoke. The side surface portion 23 has a pair of column portions 24, 24 located on the front and rear sides respectively and extending substantially in the up-down direction and a connection portion 25 connected to lower end portions of the column portions 24, 24 and extending in the front-rear direction.

The second member 21 is formed of a first surface-shaped portion 26 having one surface facing upward and the other surface facing downward and a second surface-shaped portion 27 having one surface facing rightward and the other surface facing leftward, and the left end of the first surface-shaped portion 26 is aligned with and connected to the lower end of the second surface-shaped portion 27. A placement hole 26a is formed through a central portion of the first surface-shaped portion 26. An insertion placement hole 27a is formed through a central portion of the second surface-shaped portion 27.

A lower end portion of the side surface portion 23 of the first member 20 is connected and fastened to a right end portion of the first surface-shaped portion 26 of the second member 21, for example, with screws.

The inner frame 17 is disposed inside the outer frame 16 and formed of a first support member 28 and a second support member 29 connected to each other.

The first support member 28 is formed of an attachment surface portion 30 having one surface facing upward and the other surface facing downward and an attachment surface portion 31 having one surface facing rightward and the other surface facing leftward, and the right end of the attachment surface portion 30 is aligned with and connected to the upper end of the attachment surface portion 31. An insertion hole 30a is formed through a central portion of the attachment surface portion 30. The attachment surface portion 30 functions not only as part of a frame to which part of the first drive motor, which will be described later, is attached but also as a yoke. An insertion hole 31a is formed through a central portion of the attachment surface portion 31. The attachment surface portion 31 functions not only as part of a frame to which part of a second drive motor, which will be described later, is attached but also as a yoke.

The second support member 29 is formed of a bottom surface portion 32 having one surface facing upward and the other surface facing downward and a left side surface portion 33 having one surface facing rightward and the other surface facing leftward, and the left end of the bottom surface portion 32 is aligned with and connected to the lower end of the left side surface portion 33. An attachment hole 32a is formed through a central portion of the bottom surface portion 32. A placement hole 33a is formed through a central portion of the left side surface portion 33.

A lower end portion of the attachment surface portion 31 of the first support member 28 is connected and fastened to a right end portion of the bottom surface portion 32 of the second support member 29, for example, with screws, and a left end portion of the attachment surface portion 30 of the first support member 28 is connected and fastened to an upper end portion of the left side surface portion 33 of the second support member 29, for example, with screws.

The holding frame 18 is disposed inside the inner frame 17 and is formed of a first attachment member 34 and a second attachment member 35 connected to each other.

The first attachment member 34 is formed of an upper surface portion 36 having one surface facing upward and the other surface facing downward and an attachment surface portion 37 having one surface facing rightward and the other surface facing leftward, and the right end of the upper surface portion 36 is aligned with and connected to the upper end of the attachment surface portion 37. An insertion hole 37a is formed through a central portion of the attachment surface portion 37. The attachment surface portion 37 functions not only as part of a frame to which part of the second drive motor, which will be described later, is attached but also as a yoke.

The second attachment member 35 is formed of a lower surface portion 38 having one surface facing upward and the other surface facing downward and a left side surface portion 39 having one surface facing rightward and the other surface facing leftward, and the left end of the lower surface portion 38 is aligned with and connected to the lower end of the left side surface portion 39. An attachment hole 39a is formed through a central portion of the left side surface portion 39.

A lower end portion of the attachment surface portion 37 of the first attachment member 34 is connected and fastened to a right end portion of the lower surface portion 38 of the second attachment member 35, for example, with screws, and a left end portion of the upper surface portion 36 of the first attachment member 34 is connected and fastened to an upper end portion of the left side surface portion 39 of the second attachment member 35, for example, with screws.

The lens unit 19 is disposed inside the holding frame 18 and includes a lens barrel 40, a plurality of lenses 41, 41, . . . arranged in the lens barrel 40 in the front-rear direction, and an imaging unit 42 attached to the rear end of the lens barrel 40. The lens barrel 40 has a tubular shape elongated in the front-rear direction. The imaging unit 42 includes an imaging device (not shown), such as a CCD (charge coupled device) and a CMOS (complementary metal-oxide semiconductor) device.

A cover member 43 is attached to the front surface of the lens barrel 40 around the outer circumference of the lens 41 closest to the front side. The cover member 43 has an annular shape and has a front surface having a spherical shape convex forward.

Figure 4:
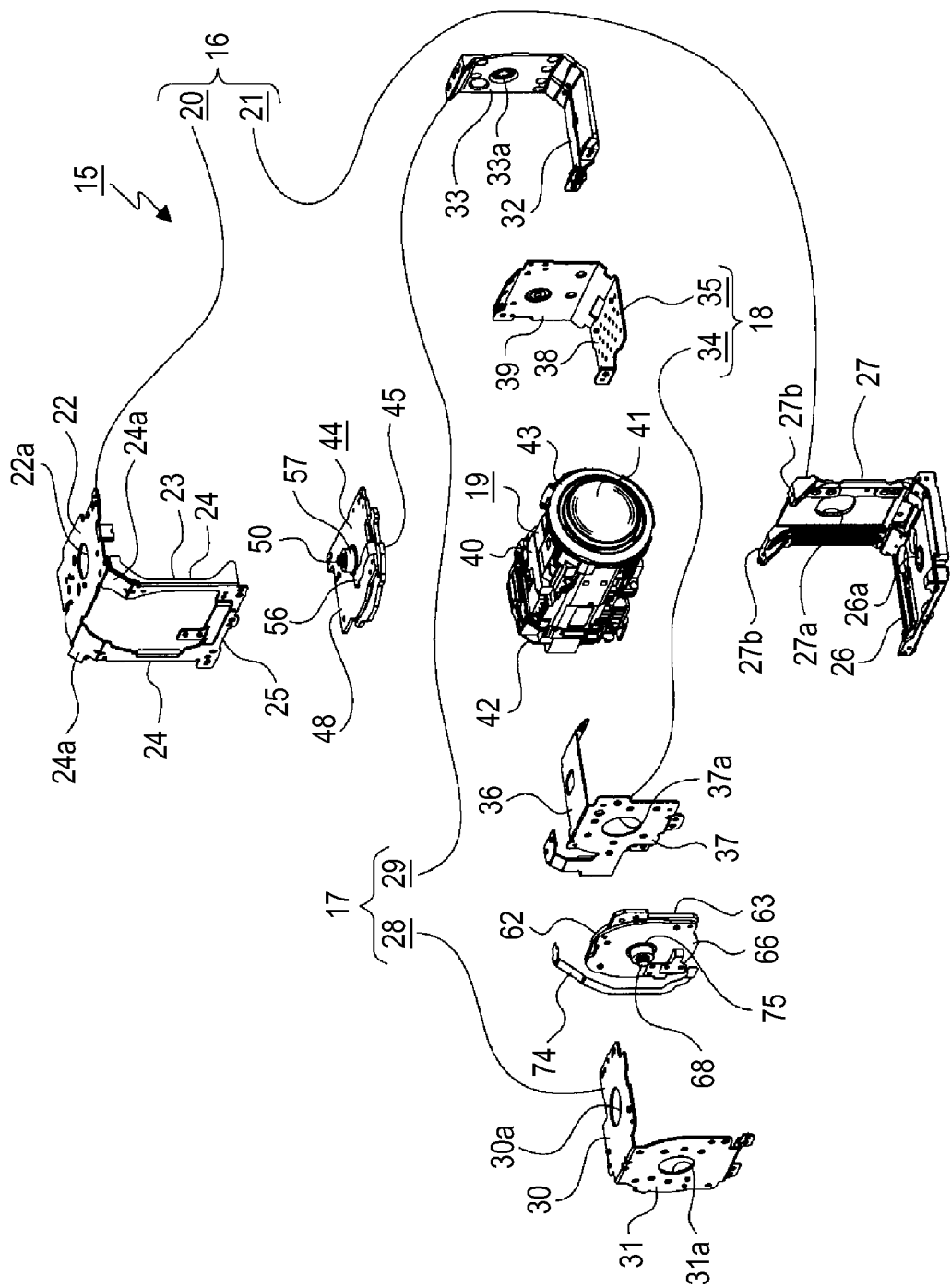
FIG. 4 is an exploded perspective view of the image blur correction unit.
Figure 6:
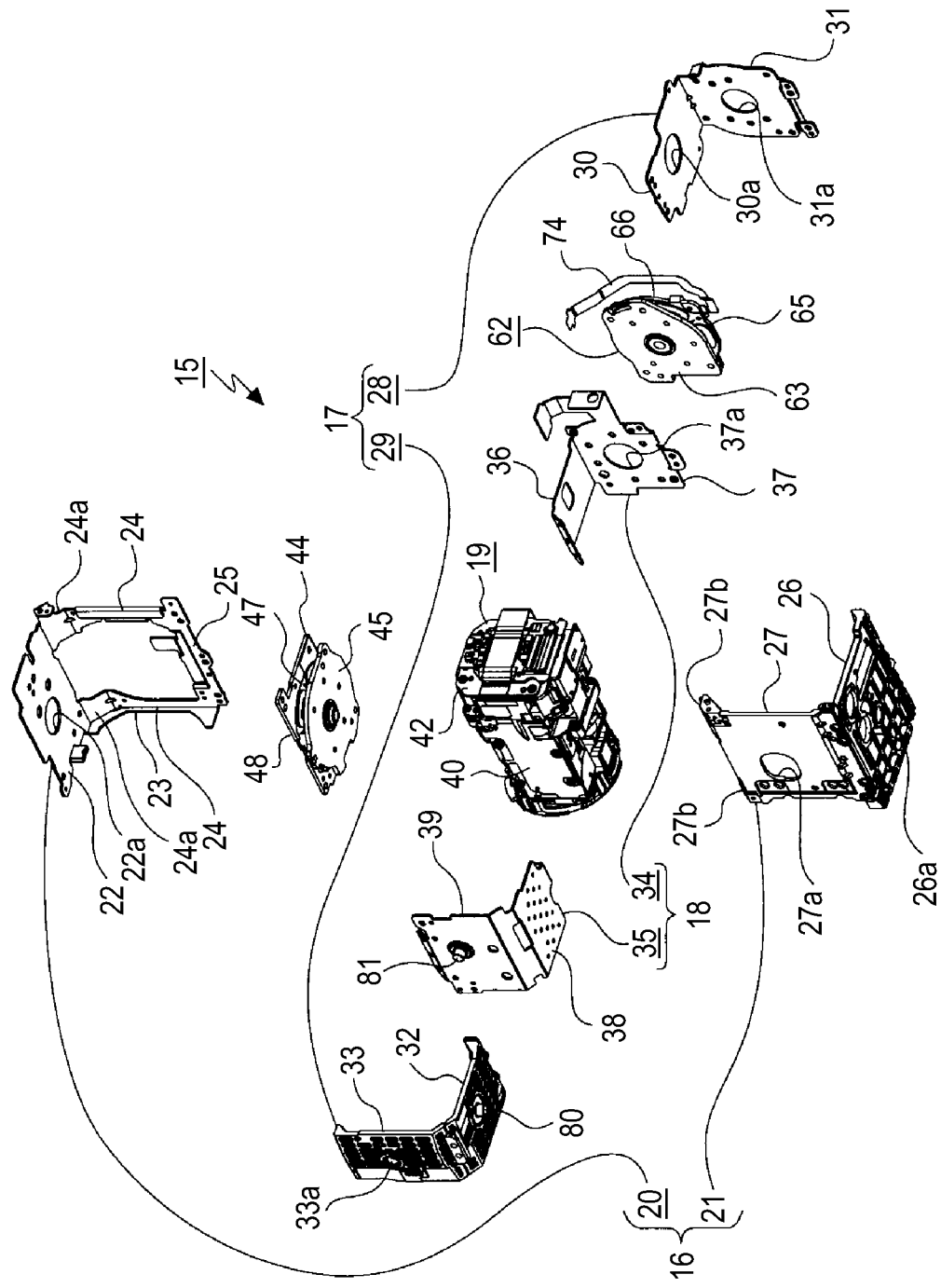
FIG. 6 is an exploded perspective view of the image blur correction unit viewed in a direction different from the viewing direction in FIG. 4.
Figure 7:
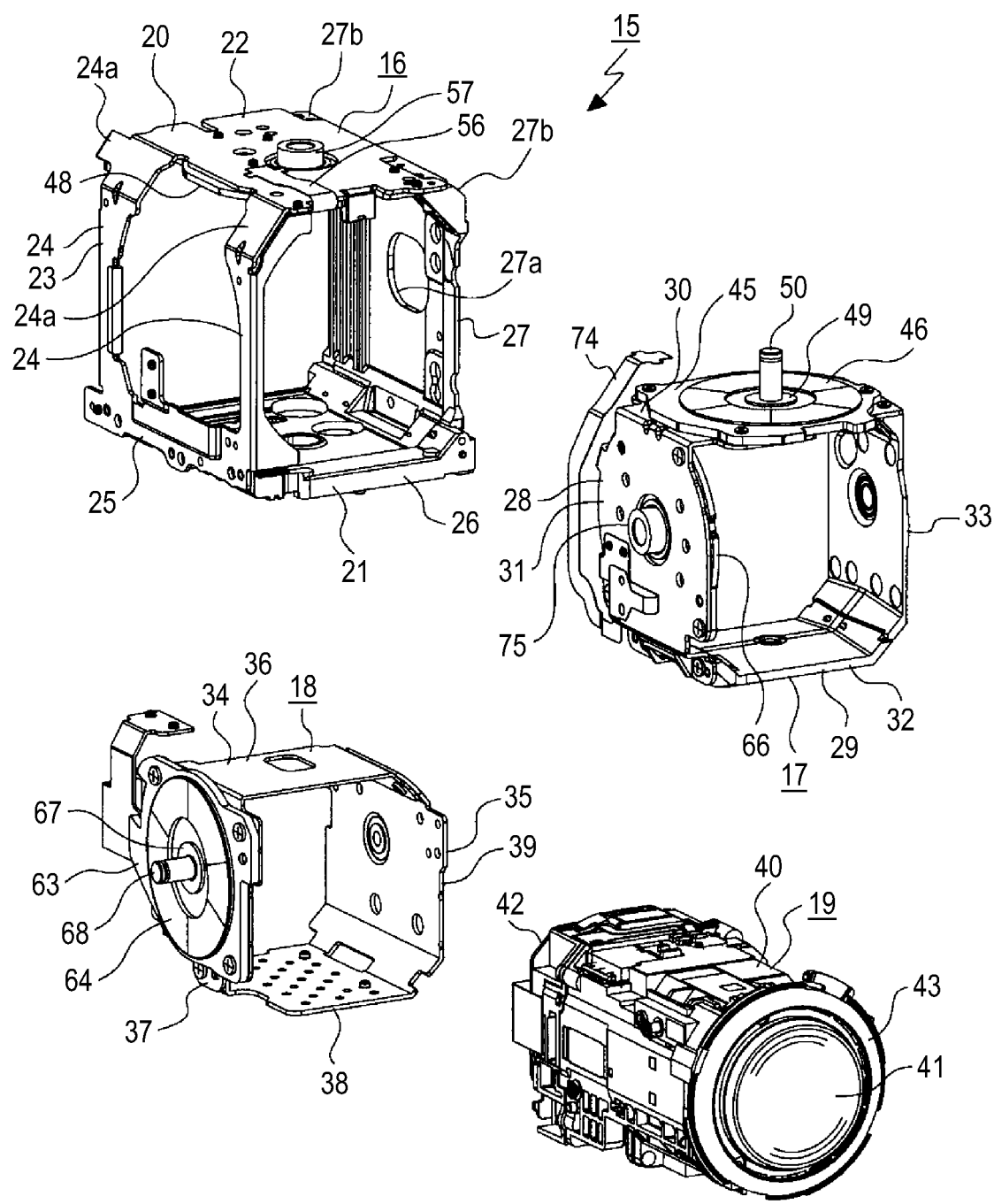
FIG. 7 is a perspective view of the image blur correction unit with an outer frame, an inner frame, a holding frame, and a lens unit separated from each other.
Figure 8:
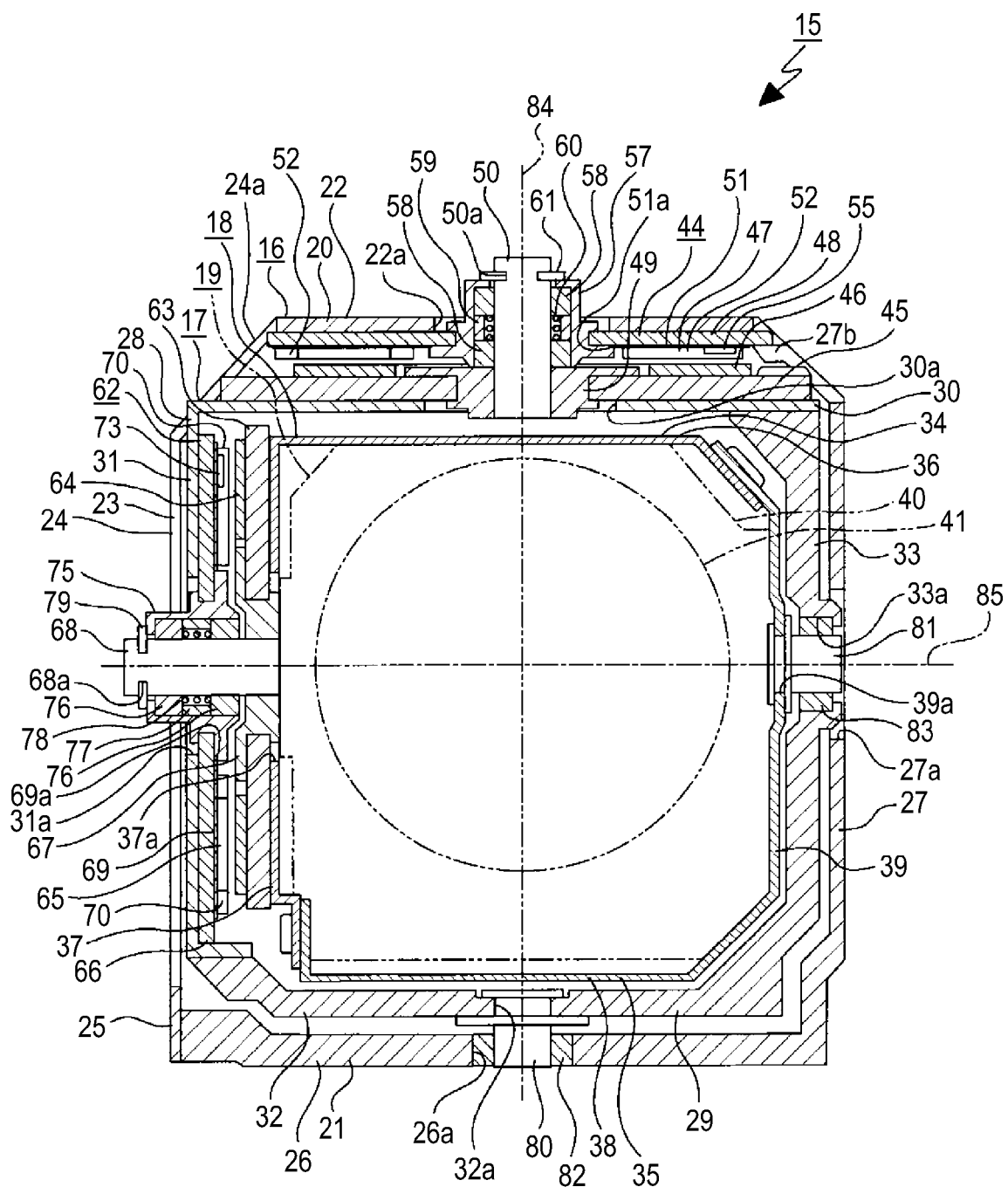
FIG. 8 is a schematic enlarged cross-sectional view of the image blur correction unit.

A first drive motor 44 is disposed above the lens unit 19 (see FIGS. 4, 6, and 8).

Figure 9:
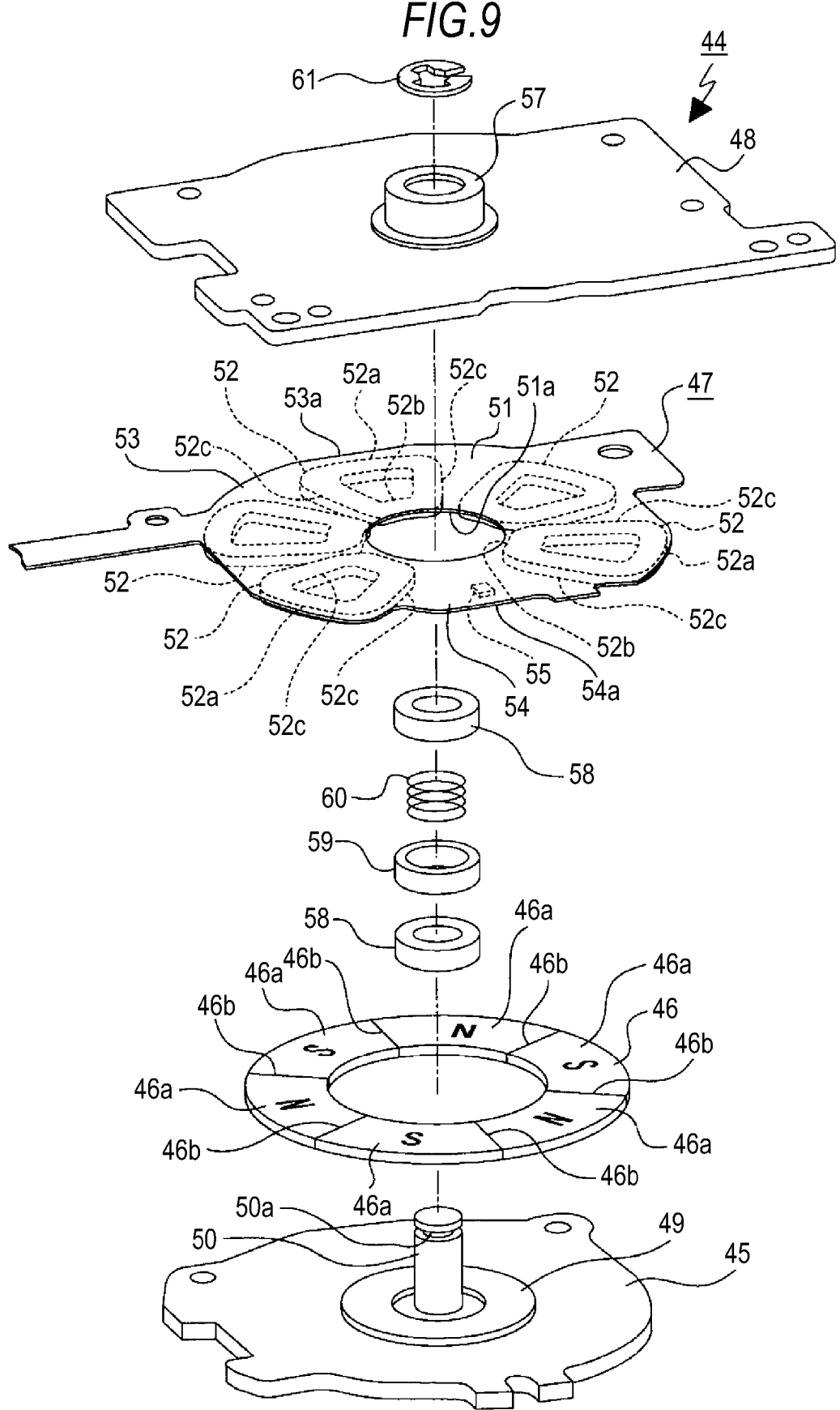
FIG. 9 is an enlarged exploded perspective view of a first drive motor.
Figure 10:
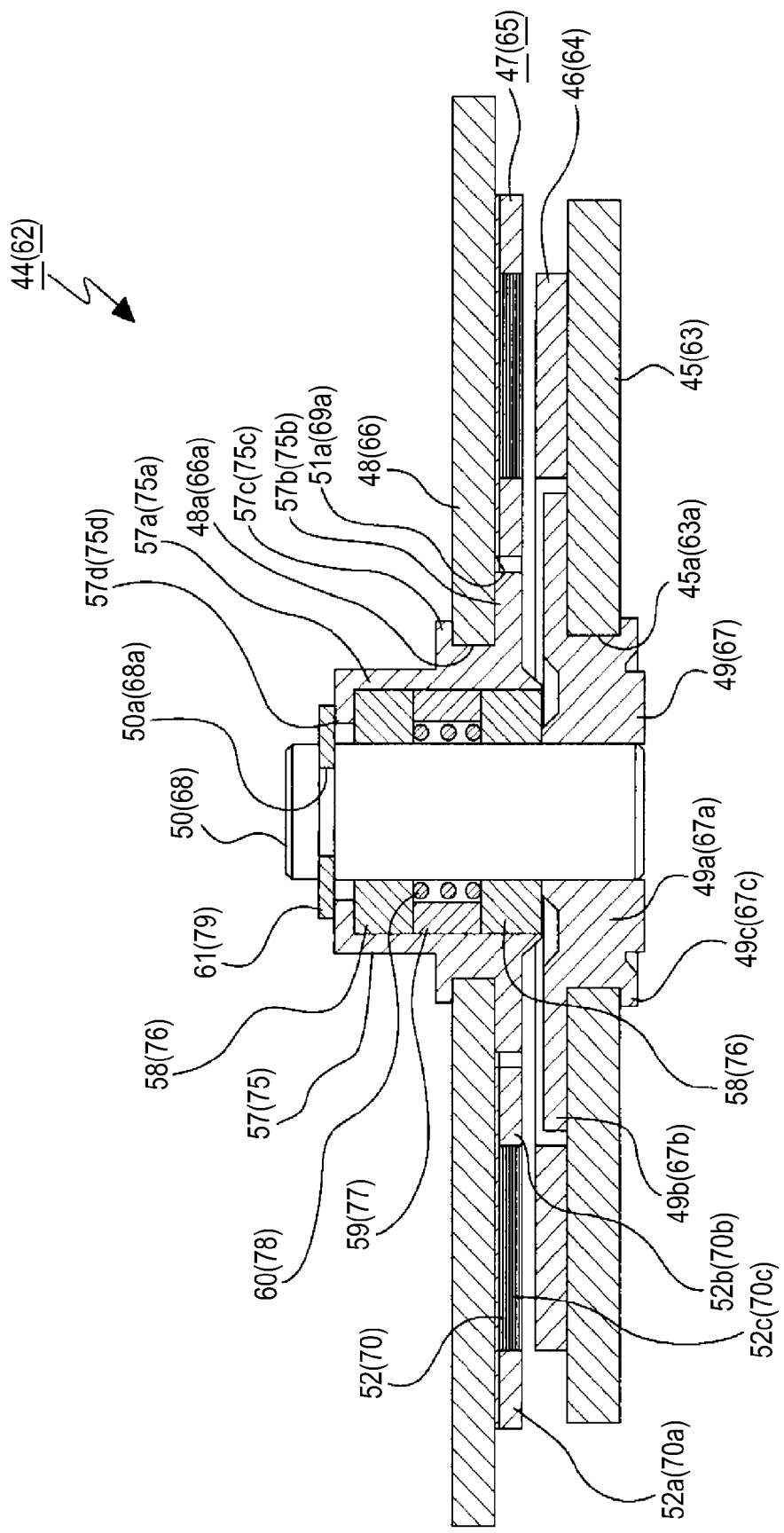
FIG. 10 is an enlarged cross-sectional view of the drive motor.

The first drive motor 44 is, for example, a flat-shaped motor, specifically, thin in the up-down direction, and has a first attachment plate 45, a magnet 46, a coil body 47, and a second attachment plate 48 (see FIGS. 8 to 10).

The first attachment plate 45 has a first fixing hole 45a oriented in the up-down direction and located in a substantially central portion. A first shaft holding member 49 is inserted into the first fixing hole 45a and fixed to the first attachment plate 45. The first attachment plate 45 functions as a yoke.

The first shaft holding member 49 is made of a very hard material, such as brass, and has a substantially tubular shaft holding portion 49a having an axial direction extending in the up-down direction, a flange portion 49b overhanging outward in the radial direction from an upper end portion of the shaft holding portion 49a, and a caulking portion 49c overhanging outward in the radial direction from a lower end portion of the shaft holding portion 49a with the three portions integrated with each other. The outer diameter of the flange portion 49b is set to be greater than the outer diameter of the caulking portion 49c.

The first shaft holding member 49 is fixed to the first attachment plate 45 in the following manner: Before the caulking portion 49c is formed in a caulking deformation process, the shaft holding portion 49a is inserted into the first fixing hole 45a of the first attachment plate 45, and a lower end portion of the first shaft holding member 49 is deformed in the caulking process to form the caulking portion 49c. After the first shaft holding member 49 is fixed to the first attachment plate 45, the flange portion 49b presses an inner circumferential portion of the upper surface of the first attachment plate 45, and the caulking portion 49c presses an inner circumferential portion of the lower surface of the first attachment plate 45.

The first shaft holding member 49 is fixed to the first attachment plate 45 by the caulking portion 49c at a smaller strength than by the flange portion 49b because the flange portion 49b is a preprocessed portion and the caulking portion 49c is a portion formed in a mechanical caulking deformation process.

The flange portion 49b can be enlarged in the radial direction, whereas the radial size of the caulking portion 49c is limited because the amount of deformation thereof in the caulking process is limited, and the caulking portion 49c is therefore typically smaller than the flange portion 49b in the radial direction. The strength at which the caulking portion 49c is fixed to the first attachment plate 45 is therefore smaller than the strength at which the flange portion 49b is fixed to the first attachment plate 45 also from the viewpoint described above.

The first shaft holding member 49 fixes a lower end portion of an output shaft 50, which protrudes, except the lower end portion, upward from the first shaft holding member 49. A fitting groove 50a extending in the circumferential direction is formed in the output shaft 50 in a position close to the upper end thereof.

The magnet 46, which has an annular shape and has magnetized portions that form N and S magnetic poles 46a, 46a, . . . alternately arranged in the circumferential direction, is attached to the upper surface of the first attachment plate 45. The magnetized portions of the magnet 46, for example, form six magnetic poles arranged at equal intervals of 60°, and magnetic boundaries 46b, 46b, . . . are formed between the magnetic poles 46a, 46a, . . . .

The coil body 47 is attached to the lower surface of the second attachment plate 48 and has an annular, thin-plate-shaped base portion 51 and a plurality of coils 52, 52, . . . disposed on the lower surface of the base portion 51 and arranged in separate positions in the circumferential direction. The coils 52, 52, . . . are sequentially connected to each other to form a single phase.

A shaft insertion hole 51a is formed through a central portion of the base portion 51. The base portion 51 has a placement area 53 in which the coils 52, 52, . . . are arranged and a no placement area 54 where no coils 52, 52, . . . are arranged.

Five coils 52, 52, . . . are arranged in the placement area 53, for example, in separate positions at equal intervals of 60° in the circumferential direction. Each of the coils 52 is formed of an outer circumferential portion 52a having a gently arcuate shape, an inner circumferential portion 52b located inside the outer circumferential portion 52a and having a gently arcuate shape, and thrust force generation portions 52c, 52c connecting the two ends of the outer circumferential portion 52a to the respective two ends of the inner circumferential portion 52b.

A Hall device is, for example, disposed as a magnetism detection device 55 in the no placement area 54 of the base portion 51.

The second attachment plate 48 has a second fixing hole 48a oriented in the up-down direction and located in a substantially central portion. A second shaft holding member 57 is inserted into the second fixing hole 48a and fixed to the second attachment plate 48. The second attachment plate 48 functions as a yoke.

The second shaft holding member 57 is made of a very hard material, such as brass, and has a substantially tubular shaft holding portion 57a having an axial direction extending in the up-down direction, a flange portion 57b overhanging outward in the radial direction from a lower end portion of the shaft holding portion 57a, a caulking portion 57c overhanging outward in the radial direction from the shaft holding portion 57a, specifically from a central portion thereof in the up-down direction, and a protruding portion 57d overhanging inward in the radial direction from an upper end portion of the shaft holding portion 57a with the four portions integrated with each other. The outer diameter of the flange portion 57b is set to be greater than the outer diameter of the caulking portion 57c.

A substantially upper half the second shaft holding member 57 protrudes upward from the second attachment plate 48.

The second shaft holding member 57 is fixed to the second attachment plate 48 in the following manner: Before the caulking portion 57c is formed in a caulking deformation process, the shaft holding portion 57a is inserted into the second fixing hole 48a of the second attachment plate 48, and a central portion of the shaft holding portion 57a in the up-down direction is deformed in the caulking process to form the caulking portion 57c. After the second shaft holding member 57 is fixed to the second attachment plate 48, the flange portion 57b presses an inner circumferential portion of the lower surface of the second attachment plate 48, and the caulking portion 57c presses an inner circumferential portion of the upper surface of the second attachment plate 48.

The second shaft holding member 57 is fixed to the second attachment plate 48 by the caulking portion 57c at a smaller strength than by the flange portion 57b because the flange portion 57b is a preprocessed portion and the caulking portion 57c is a portion formed in a mechanical caulking deformation process.

The flange portion 57b can be enlarged in the radial direction, whereas the radial size of the caulking portion 57c is limited because the amount of deformation thereof in the caulking process is limited, and the caulking portion 57c is therefore typically smaller than the flange portion 57b in the radial direction. The strength at which the caulking portion 57c is fixed to the second attachment plate 48 is therefore smaller than the strength at which the flange portion 57b is fixed to the second attachment plate 48 also from the viewpoint described above.

The outer diameter of the flange portion 49b of the first shaft holding member 49 is set to be greater than the outer diameter of the flange portion 57b of the second shaft holding member 57.

Annular first bearings 58, 58 and an annular spacer 59 are inserted and disposed in the second shaft holding member 57. The first bearings 58, 58, which are, for example, ball bearings, are disposed above and below the spacer 59 and sandwich the spacer 59. A compression spring 60 is disposed inside the spacer 59 and urges the first bearings 58, 58 in such away that they are separated from each other in the up-down direction.

In the state in which the first bearings 58, 58, the spacer 59, and the compression spring 60 are inserted and disposed in the second shaft holding member 57, the output shaft 50 is inserted from below through the first bearings 58, 58, the spacer 59, and the shaft insertion hole 51a of the base portion 51. The output shaft 50 is rotatably supported by the first bearings 58, 58, which are located in separate positions in the axial direction, and held by the second shaft holding member 57 via the first bearings 58, 58 and the spacer 59.

An upper end portion of the output shaft 50 protrudes upward from the second shaft holding member 57, and a fastener 61 is fit into the fitting groove 50a of the output shaft 50 in such a way that the fastener 61 comes into contact with the protruding portion 57d, whereby the output shaft 50 will not come off the second shaft holding member 57. The first drive motor 44 is thus configured.

In the state in which the first drive motor 44 is thus configured, the magnet 46 faces the coils 52, 52, . . . of the coil body 47 and hence the magnet 46 faces the thrust force generation portions 52c, 52c, . . . of the coils 52, 52, . . . , as shown in FIGS. 8 and 10. To this end, the outer diameter of the magnet 46 is set to be smaller than the outer diameter of the coil body 47, and the inner diameter of the magnet 46 is set to be larger than the inner diameter of the coil body 47.

The inner circumferential portions 52b, 52b, . . . of the coils 52, 52, . . . are so located that they face the flange portion 49b of the first shaft holding member 49, and the inner circumferential portions 52b, 52b, . . . and an outer circumferential portion of the flange portion 49b are arranged side by side in the up-down direction, that is, in the axial direction of the output shaft 50.

The magnetism detection device 55 in the coil body 47, which faces the magnet 56, is disposed inside the outer circumference of the magnet 46 and present in a position facing the magnet 56.

A current drive circuit (not shown) supplies the coils 52, 52, . . . and the magnetism detection device 55 in the coil body 47 with current via a flexible printed wiring board 56, part of which is attached to the base portion 51.

A second drive motor 62 is disposed to the right of the lens unit 19 (see FIGS. 4, 6, and 8).

Figure 11:
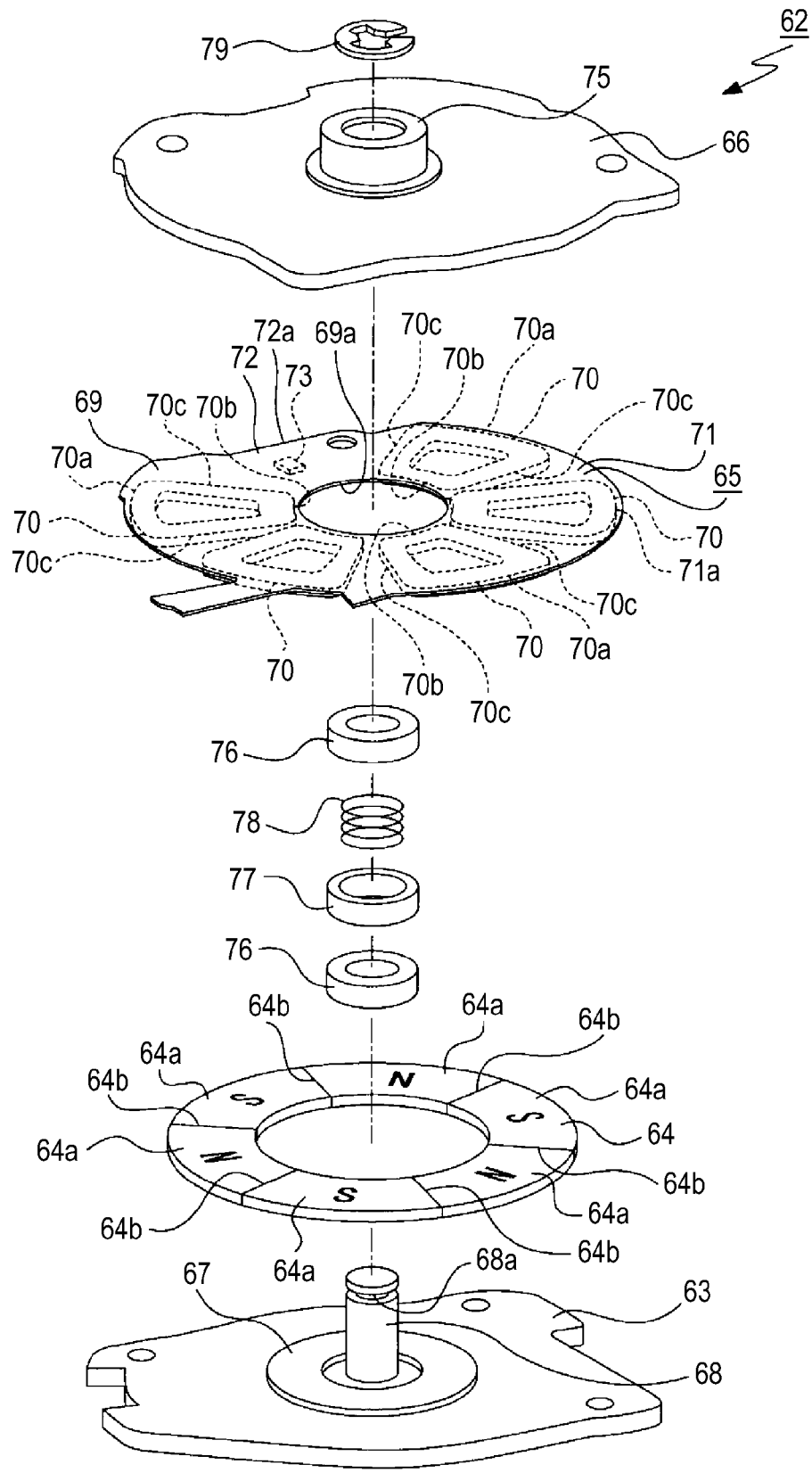
FIG. 11 is an enlarged exploded perspective view of a second drive motor.

The second drive motor 62 is, for example, a flat-shaped motor, specifically, thin in the right-left direction, and has a first attachment plate 63, a magnet 64, a coil body 65, and a second attachment plate 66 (see FIGS. 8, 10, and 11).

The first attachment plate 63 has a first fixing hole 63a oriented in the right-left direction and located in a substantially central portion. A first shaft holding member 67 is inserted into the first fixing hole 63a and fixed to the first attachment plate 63. The first attachment plate 63 functions as a yoke.

The first shaft holding member 67 is made of a very hard material, such as brass, and has a substantially tubular shaft holding portion 67a having an axial direction extending in the right-left direction, a flange portion 67b overhanging outward in the radial direction from a right end portion of the shaft holding portion 67a, and a caulking portion 67c overhanging outward in the radial direction from a left end portion of the shaft holding portion 67a with the three portions integrated with each other. The outer diameter of the flange portion 67b is set to be greater than the outer diameter of the caulking portion 67c.

The first shaft holding member 67 is fixed to the first attachment plate 63 in the following manner: Before the caulking portion 67c is formed in a caulking deformation process, the shaft holding portion 67a is inserted into the first fixing hole 63a of the first attachment plate 63, and a left end portion of the shaft holding portion 67a is deformed in the caulking process to form the caulking portion 67c. After the first shaft holding member 67 is fixed to the first attachment plate 63, the flange portion 67b presses an inner circumferential portion of the right side surface of the first attachment plate 63, and the caulking portion 67c presses an inner circumferential portion of the left side surface of the first attachment plate 63.

The first shaft holding member 67 is fixed to the first attachment plate 63 by the caulking portion 67c at a smaller strength than by the flange portion 67b because the flange portion 67b is a preprocessed portion and the caulking portion 67c is a portion formed in a mechanical caulking deformation process.

The flange portion 67b can be enlarged in the radial direction, whereas the radial size of the caulking portion 67c is limited because the amount of deformation thereof in the caulking process is limited, and the caulking portion 67c is therefore typically smaller than the flange portion 67b in the radial direction. The strength at which the caulking portion 67c is fixed to the first attachment plate 63 is therefore smaller than the strength at which the flange portion 67b is fixed to the first attachment plate 63 also from the viewpoint described above.

The first shaft holding member 67 fixes a left end portion of an output shaft 68, which protrudes, except the left end portion, rightward from the first shaft holding member 67. A fitting groove 68a extending in the circumferential direction is formed in the output shaft 68 in a position close to the right end thereof.

The magnet 64, which has an annular shape and has magnetized portions that form N and S magnetic poles 64a, 64a, alternately arranged in the circumferential direction, is attached to the right side surface of the first attachment plate 63. The magnetized portions of the magnet 64, for example, form six magnetic poles arranged at equal intervals of 60°, and magnetic boundaries 64b, 64b, . . . are formed between the magnetic poles 64a, 64a, . . . .

The coil body 65 is attached to the left side surface of the second attachment plate 66 and has an annular, thin-plate-shaped base portion 69 and a plurality of coils 70, 70, . . . disposed on the left side surface of the base portion 69 and arranged in separate positions in the circumferential direction. The coils 70, 70, . . . are sequentially connected to each other to form a single phase.

A shaft insertion hole 69a is formed through a central portion of the base portion 69. The base portion 69 has a placement area 71 in which the coils 70, 70, . . . are arranged and a no placement area 72 where no coils 70, 70, . . . are arranged.

Five coils 70, 70, . . . are arranged in the placement area 71, for example, in separate positions at equal intervals of 60° in the circumferential direction. Each of the coils 70 is formed of an outer circumferential portion 70a having a gently arcuate shape, an inner circumferential portion 70b located inside the outer circumferential portion 70a and having a gently arcuate shape, and thrust force generation portions 70c, 70c connecting the two ends of the outer circumferential portion 70a to the respective two ends of the inner circumferential portion 70b.

A Hall device is, for example, disposed as a magnetism detection device 73 in the no placement area 72 of the base portion 69.

The second attachment plate 66 has a second fixing hole 66a oriented in the right-left direction and located in a substantially central portion. A second shaft holding member 75 is inserted into the second fixing hole 66a and fixed to the second attachment plate 66. The second attachment plate 66 functions as a yoke.

The second shaft holding member 75 is made of a very hard material, such as brass, and has a substantially tubular shaft holding portion 75a having an axial direction extending in the right-left direction, a flange portion 75b overhanging outward in the radial direction from a left end portion of the shaft holding portion 75a, a caulking portion 75c overhanging outward in the radial direction from the shaft holding portion 75a, specifically, from a central portion thereof in the right-left direction, and a protruding portion 75d overhanging inward in the radial direction from a right end portion of the shaft holding portion 75a with the four portions integrated with each other. The outer diameter of the flange portion 75b is set to be greater than the outer diameter of the caulking portion 75c.

A substantially right half the second shaft holding member 75 protrudes rightward from the second attachment plate 66.

The second shaft holding member 75 is fixed to the second attachment plate 66 in the following manner: Before the caulking portion 75c is formed in a caulking deformation process, the shaft holding portion 75a is inserted into the second fixing hole 66a of the second attachment plate 66, and a central portion of the shaft holding portion 75a in the right-left direction is deformed in the caulking process to form the caulking portion 75c. After the second shaft holding member 75 is fixed to the second attachment plate 66, the flange portion 75b presses an inner circumferential portion of the left side surface of the second attachment plate 66, and the caulking portion 75c presses an inner circumferential portion of the right side surface of the second attachment plate 66.

The second shaft holding member 75 is fixed to the second attachment plate 66 by the caulking portion 75c at a smaller strength than by the flange portion 75b because the flange portion 75b is a preprocessed portion and the caulking portion 75c is a portion formed in a mechanical caulking deformation process.

The flange portion 75b can be enlarged in the radial direction, whereas the radial size of the caulking portion 75c is limited because the amount of deformation thereof in the caulking process is limited, and the caulking portion 75c is therefore typically smaller than the flange portion 75b in the radial direction. The strength at which the caulking portion 75c is fixed to the second attachment plate 66 is therefore smaller than the strength at which the flange portion 75b is fixed to the second attachment plate 66 also from the viewpoint described above.

The outer diameter of the flange portion 67b of the first shaft holding member 67 is set to be greater than the outer diameter of the flange portion 75b of the second shaft holding member 75.

Annular first bearings 76, 76 and an annular spacer 77 are inserted and disposed in the second shaft holding member 75. The first bearings 76, 76, which are, for example, ball bearings, are disposed to the right and left to the spacer 77 and sandwich the spacer 77. A compression spring 78 is disposed inside the spacer 77 and urges the first bearings 76, 76 in such a way that they are separated from each other in the right-left direction.

In the state in which the first bearings 76, 76, the spacer 77, and the compression spring 78 are inserted and disposed in the second shaft holding member 75, the output shaft 68 is inserted from the left through the first bearings 76, 76, the spacer 77, and the shaft insertion hole 69a of the base portion 69. The output shaft 68 is rotatably supported by the first bearings 76, 76, which are located in separate positions in the axial direction, and held by the second shaft holding member 75 via the first bearings 76, 76 and the spacer 77.

A right end portion of the output shaft 68 protrudes rightward from the second shaft holding member 75, and a fastener 79 is fit into the fitting groove 68a of the output shaft 68 in such a way that the fastener 79 comes into contact with the protruding portion 75d, whereby the output shaft 68 will not come off the second shaft holding member 75. The second drive motor 62 is thus configured.

In the state in which the second drive motor 62 is thus configured, the magnet 64 faces the coils 70, 70, . . . of the coil body 65 and hence the magnet 64 faces the thrust force generation portions 70*c*, 70*c*, . . . of the coils 70, 70, . . . , as shown in FIGS. 8 and 10. To this end, the outer diameter of the magnet 64 is set to be smaller than the outer diameter of the coil body 65, and the inner diameter of the magnet 64 is set to be larger than the inner diameter of the coil body 65.

The inner circumferential portions 70*b*, 70*b*, . . . of the coils 70, 70, . . . are so located that they face the flange portion 67*b* of the first shaft holding member 67, and the inner circumferential portions 70*b*, 70*b*, . . . and an outer circumferential portion of the flange portion 67*b* are arranged side by side in the right-left direction, that is, in the axial direction of the output shaft 68.

The magnetism detection device 73 in the coil body 65, which faces the magnet 64, is disposed inside the outer circumference of the magnet 64 and present in a position facing the magnet 64.

A current drive circuit (not shown) supplies the coils 70, 70, . . . and the magnetism detection device 73 in the coil body 65 with current via a flexible printed wiring board 74, part of which is attached to the base portion 69.

A sub-shaft 80 is attached to the attachment hole 32*a* of the bottom surface portion 32 of the inner frame 17 (see FIG. 8). An upper end portion of the sub-shaft 80 is attached to the attachment hole 32*a*, and the portion other than the upper end portion protrudes downward from the bottom surface portion 32.

A sub-shaft 81 is attached to the attachment hole 39*a* of the left side surface portion 39 of the holding frame 18. A right end portion of the sub-shaft 81 is attached to the attachment hole 39*a*, and the portion other than the right end portion protrudes leftward from the left side surface portion 39.

A second bearing 82 is inserted and disposed in the placement hole 26*a* of the first surface-shaped portion 26 of the outer frame 16. The second bearing 82 is, for example, a ball bearing.

A second bearing 83 is inserted and disposed in the placement hole 33*a* of the left side surface portion 33 of the inner frame 17. The second bearing 83 is, for example, a ball bearing.

[Inter-Unit Attachment Structure]

Figure 12:
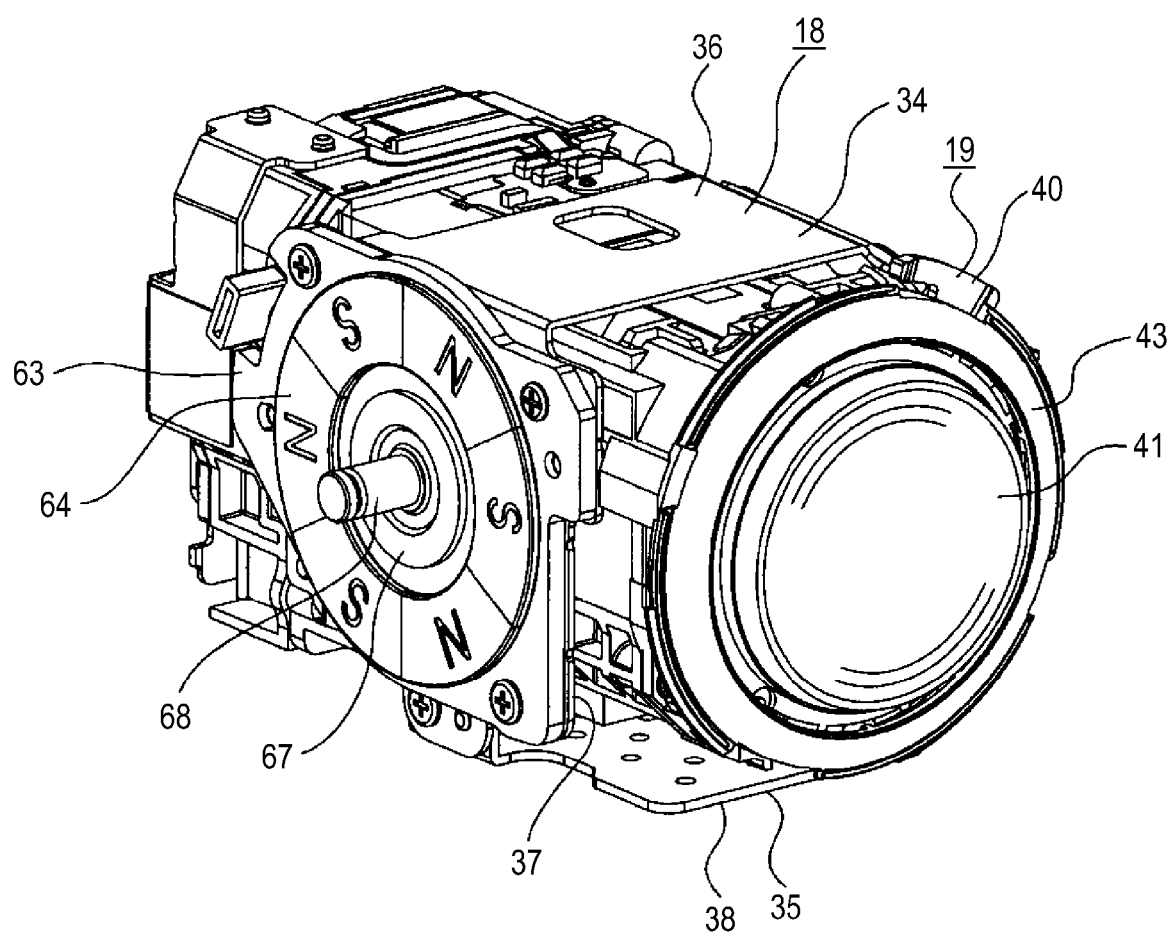
FIG. 12 is a perspective view of the image blur correction unit with the outer frame, the inner frame, and part of the second drive motor attached to the inner frame removed from the image blur correction unit.

The holding frame 18 is attached and fastened to the outer circumferential surface of the lens unit 19, for example, with screws (see FIGS. 8 and 12). In the state in which the holding frame 18 is attached to the lens unit 19, both front and rear end portions of the lens unit 19 protrude forward and rearward respectively from the holding frame 18.

The first attachment plate 63 of the second drive motor 62 is attached and fastened to the outer surface of the attachment surface portion 37 of the holding frame 18, for example, with screws. The second drive motor 62 is thus disposed to the right of the holding frame 18.

Figure 13:
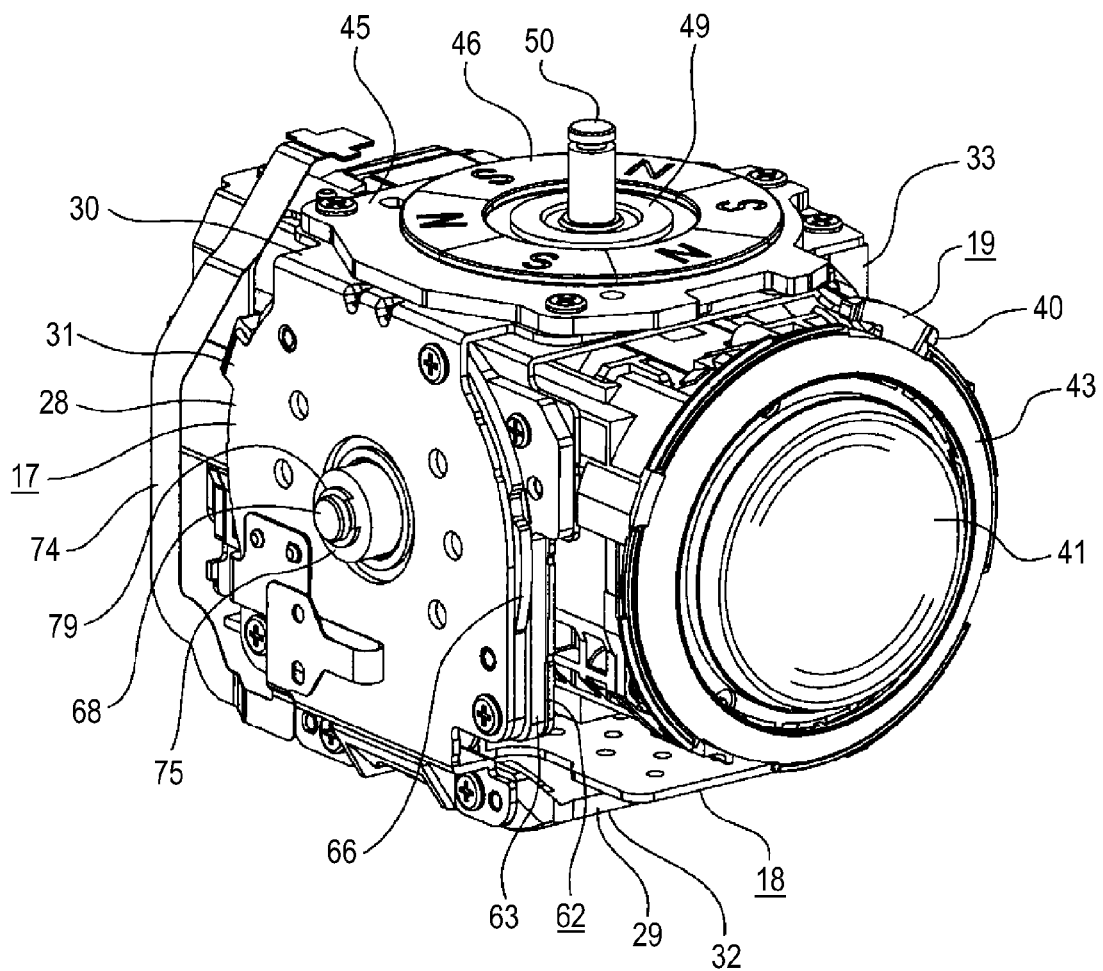
FIG. 13 is a perspective view of the image blur correction unit with the outer frame and part of the first drive motor attached to the outer frame removed from the image blur correction unit.
Figure 14:
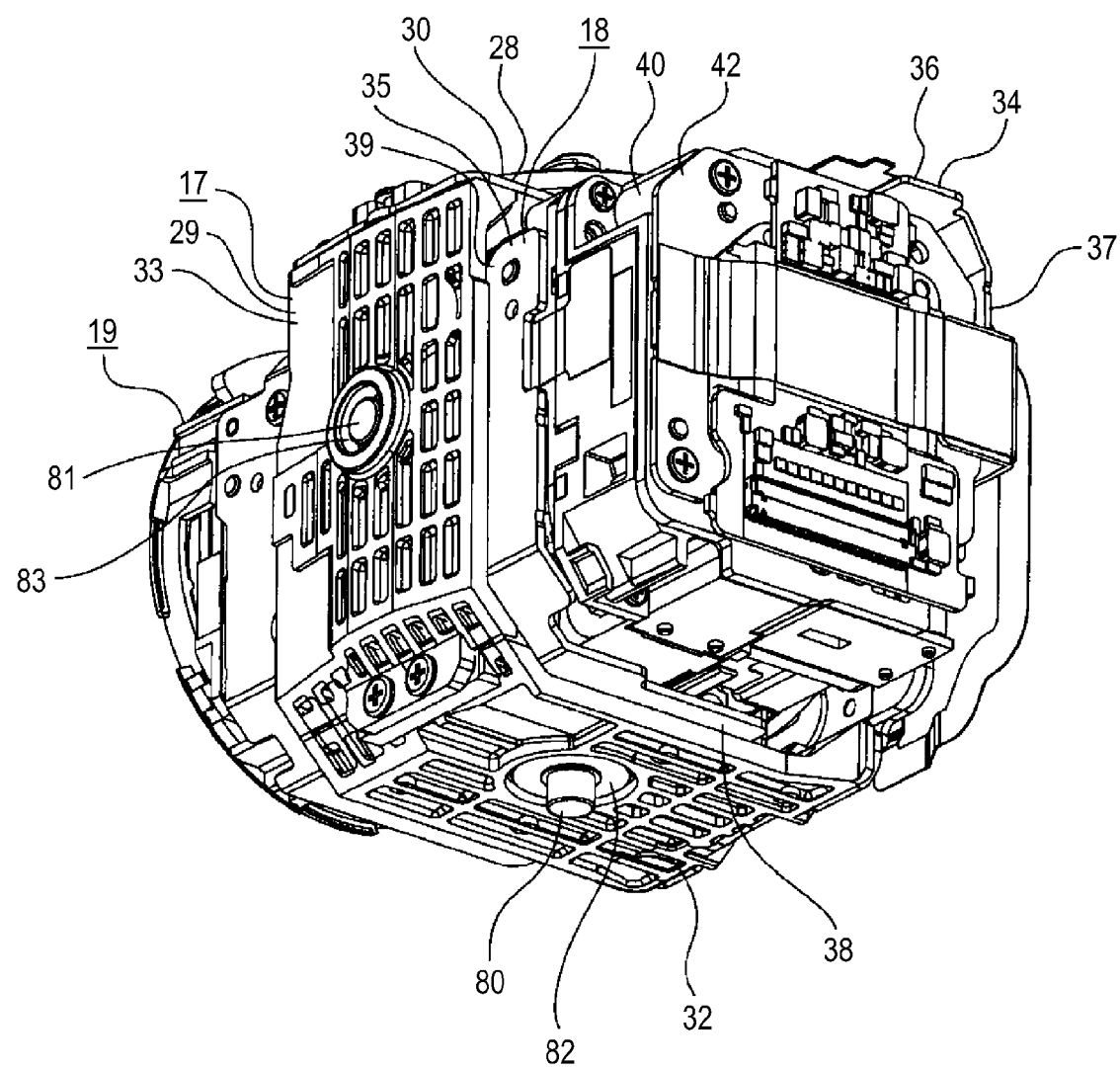
FIG. 14 is a perspective view of the image blur correction unit with the outer frame and part of the first drive motor attached to the outer frame removed from the image blur correction unit viewed in a direction different from the viewing direction in FIG. 13.

The inner frame 17 is disposed around the outer circumference of the holding frame 18 (see FIGS. 8, 13, and 14). In the state in which the inner frame 17 is disposed around the outer circumference of the holding frame 18, the sub-shaft 81 attached to the left side surface portion 39 of the holding frame 18 is rotatably supported by the second bearing 83 attached to the left side surface portion 33 of the inner frame 17.

Figure 15:
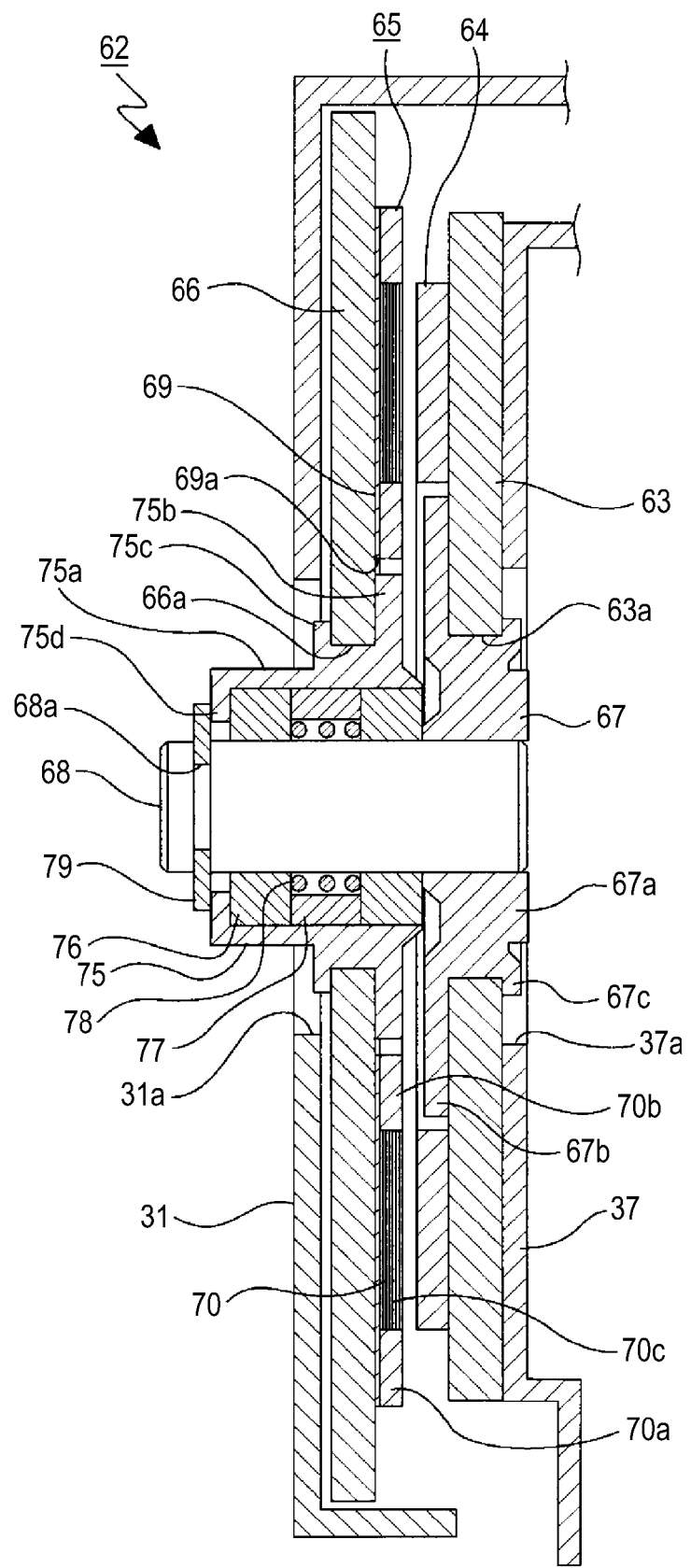
FIG. 15 is an enlarged cross-sectional view showing the second drive motor attached to the frame.

The second attachment plate 66 of the second drive motor 62 is attached and fastened to the inner surface of the attachment surface portion 31 of the inner frame 17, for example, with screws (see FIGS. 8 and 15). In this process, the no placement area 72 of the base portion 69 of the coil body 65 is positioned on the upper side.

The second shaft holding member 75 of the second drive motor 62 is inserted into the insertion hole 31*a* formed through the attachment surface portion 31 of the inner frame 17 and protrudes rightward, and the caulking portion 75*c* of the second shaft holding member 75 is also inserted and disposed the insertion hole 31*a*. At this point, the caulking portion 67*c* of the first shaft holding member 67 attached to the first attachment plate 63 has been inserted and disposed in the insertion hole 37*a* formed through the attachment surface portion 37 of the holding frame 18. The amount of rightward protrusion of the second shaft holding member 75 therefore decreases, whereby the size of the image blur correction unit 15 can be reduced.

The first attachment plate 45 of the first drive motor 44 is attached and fastened to the upper surface of the attachment surface portion 30 of the inner frame 17, for example, with screws. The first drive motor 44 is thus disposed above the inner frame 17.

Figure 3:
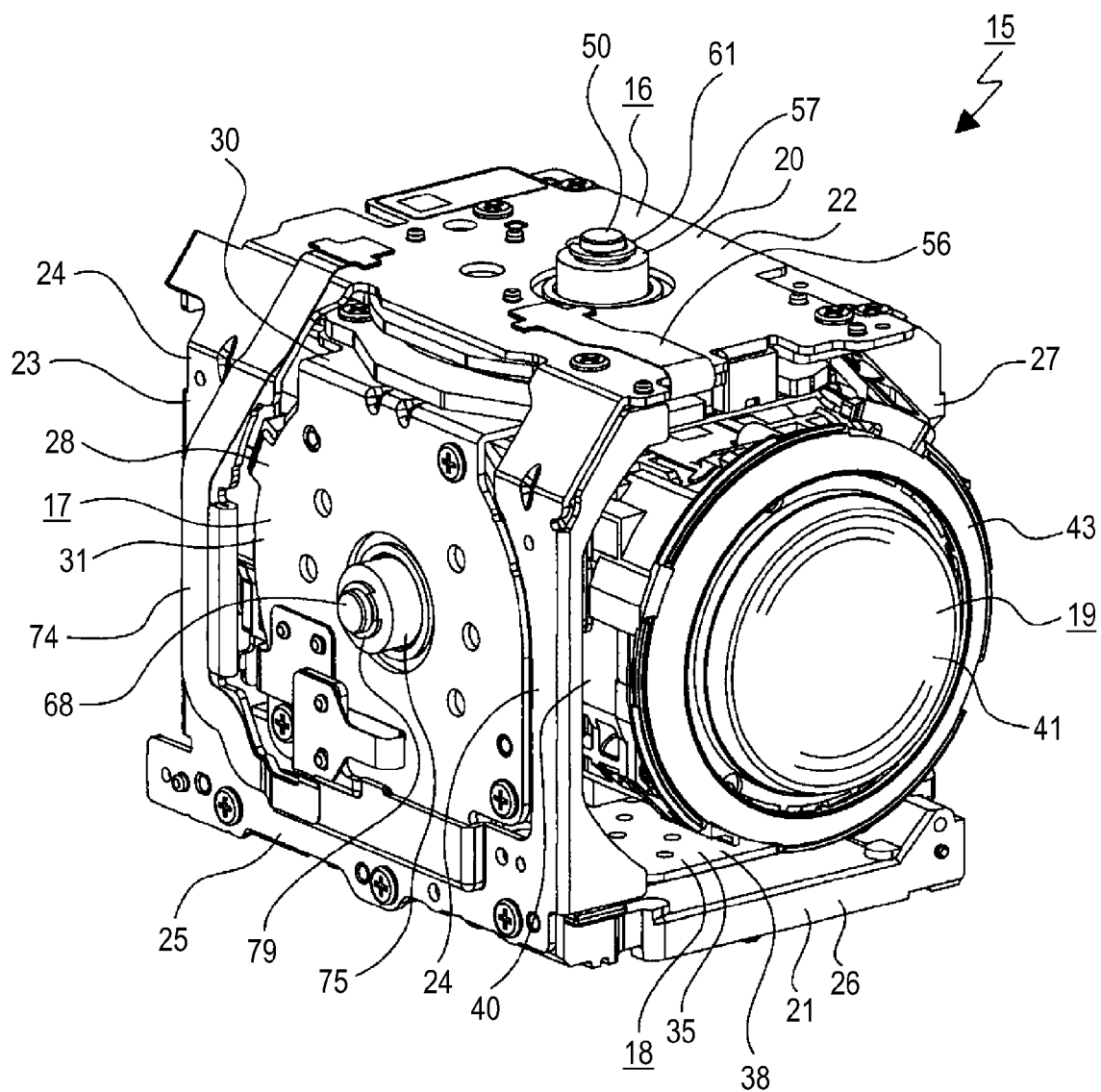
FIG. 3 is a perspective view showing an image blur correction unit.
Figure 5:
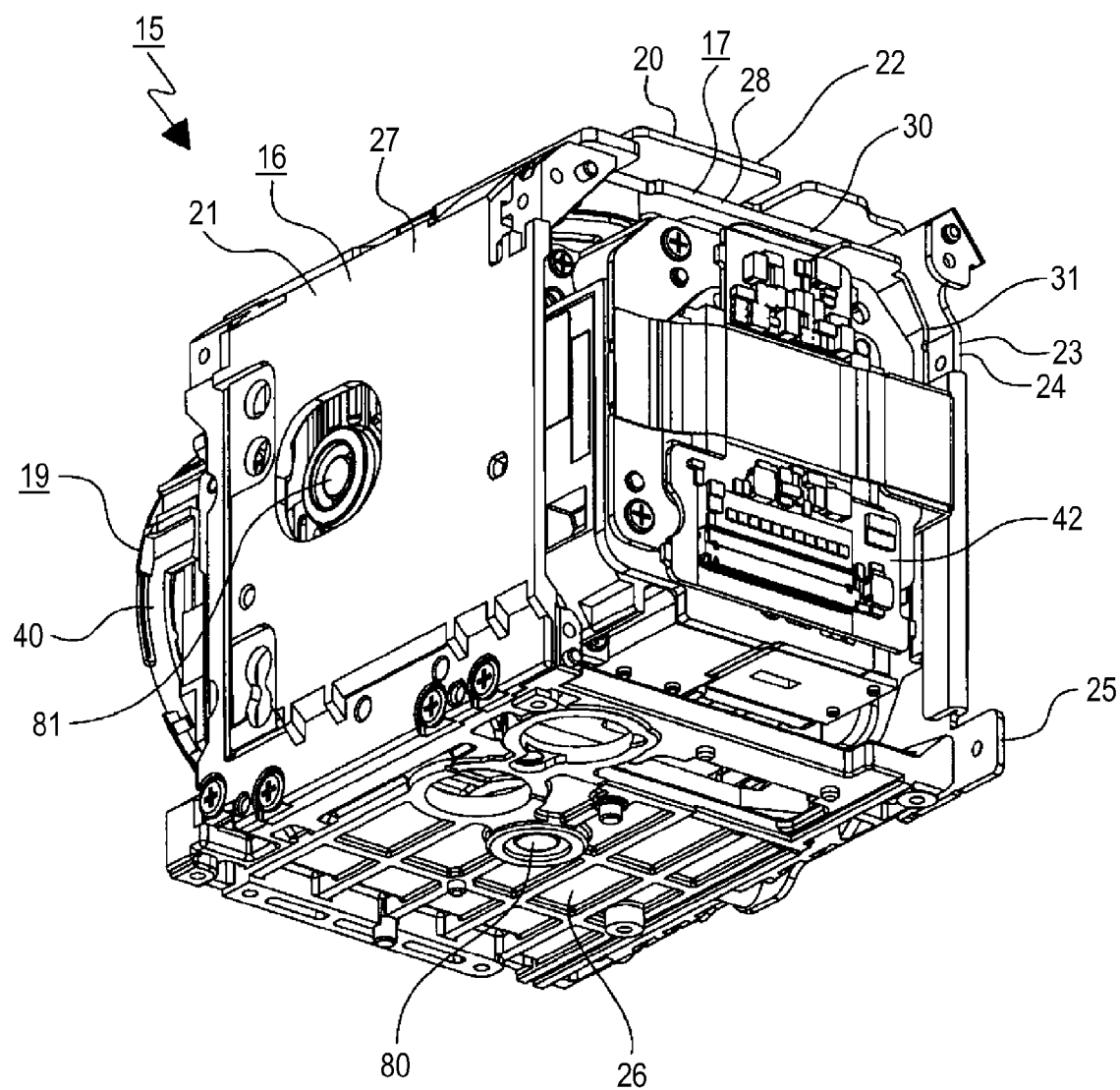
FIG. 5 is a perspective view of the image blur correction unit viewed in a direction different from the viewing direction in FIG. 3.

The outer frame 16 is disposed around the outer circumference of the inner frame 17 (see FIGS. 3, 5, and 8). In this process, aright end portion of the second shaft holding member 75 for the second drive motor 62 protrudes rightward through the side surface portion 23 of the outer frame 16.

In the state in which the outer frame 16 is disposed around the outer circumference of the inner frame 17, the sub-shaft 80 attached to the bottom surface portion 32 of the inner frame 17 is rotatably supported by the second bearing 82 attached to the first surface-shaped portion 26 of the outer frame 16.

Figure 16:
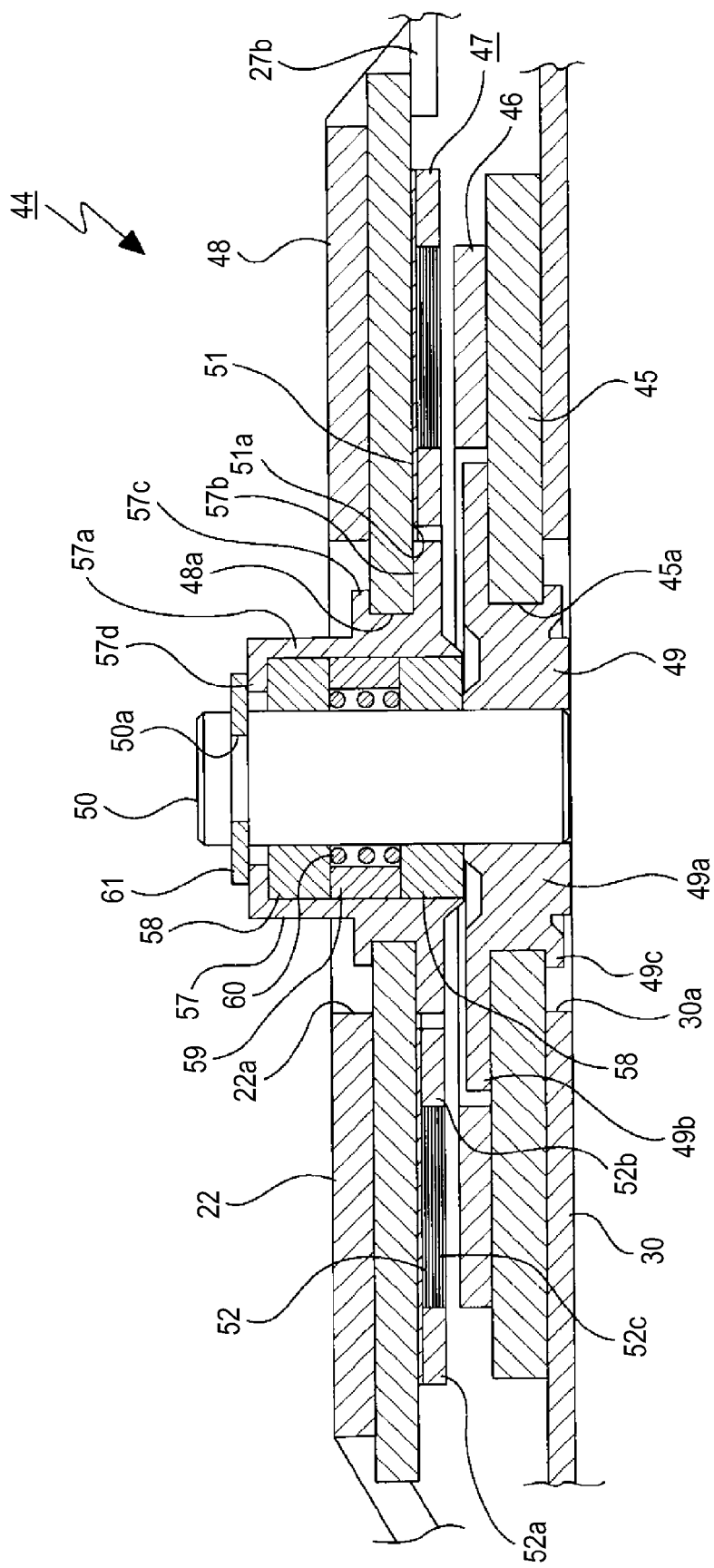
FIG. 16 is an enlarged cross-sectional view showing the first drive motor attached to the frame.
Figure 17:
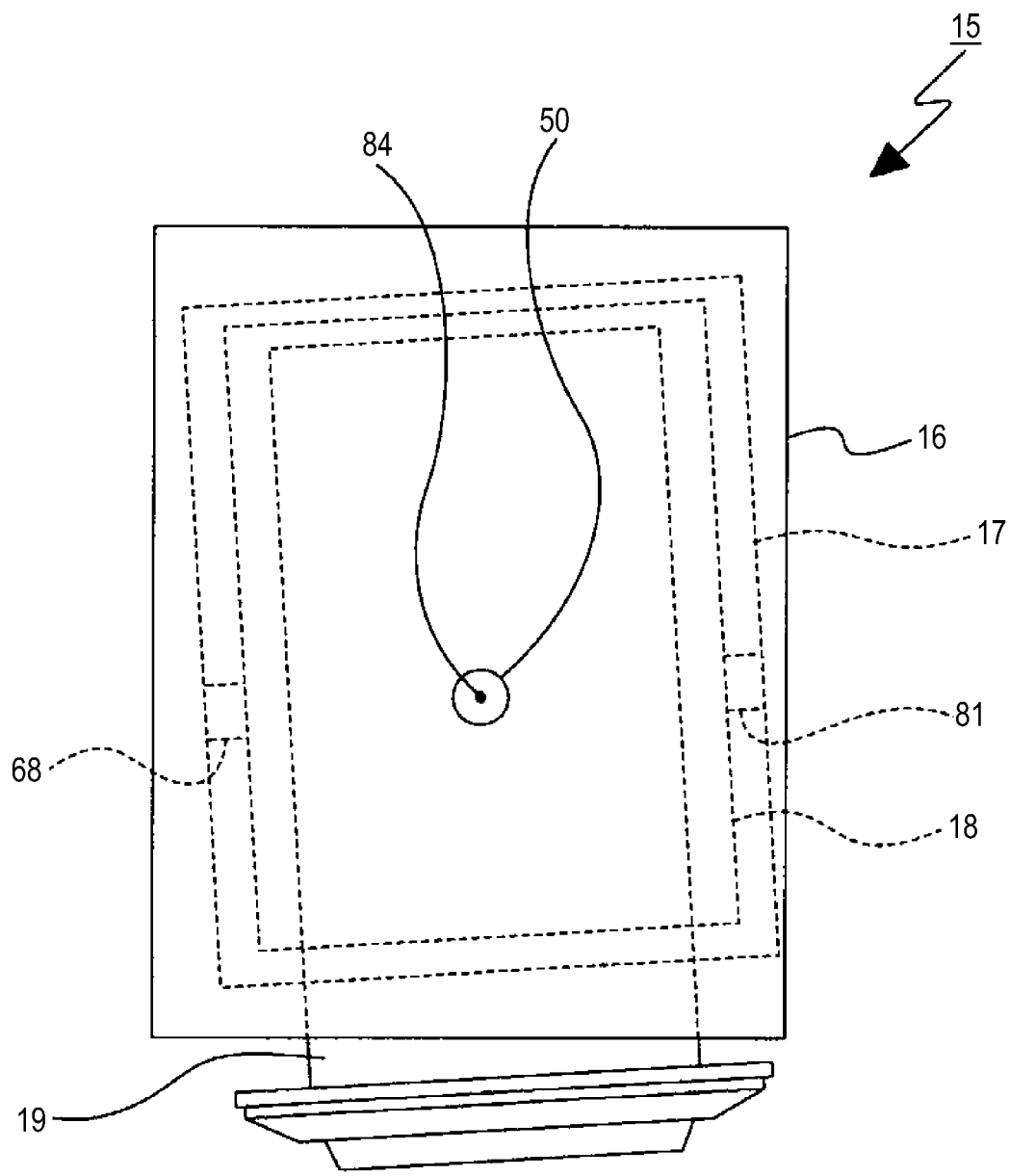
FIG. 17, along with FIG. 18, shows the lens unit having pivoted in the yawing direction and is a schematic plan view showing the lens unit having pivoted in one of the pivotal movement sides of the yawing direction.
Figure 18:
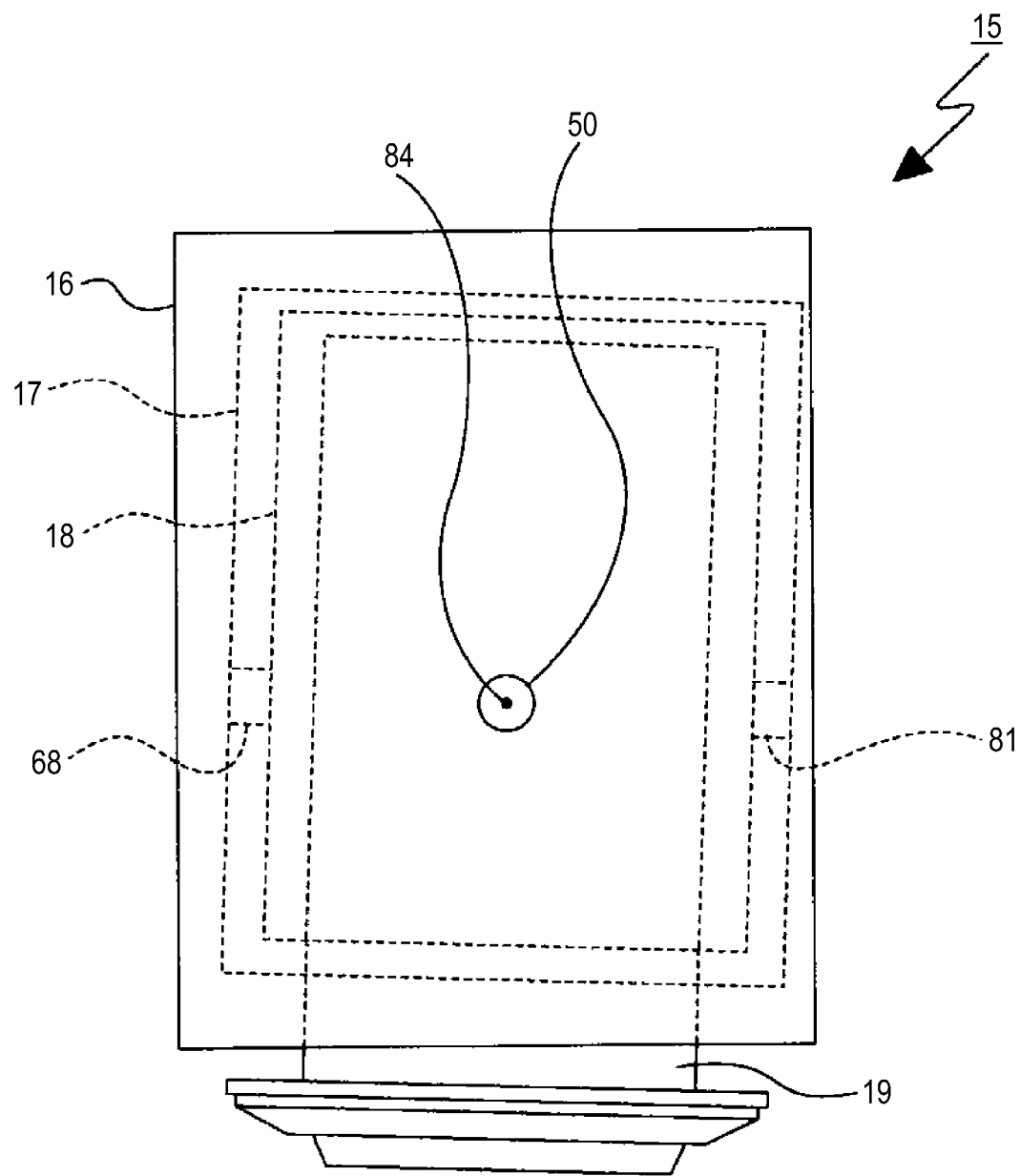
FIG. 18 is a schematic plan view showing the lens unit having pivoted in the other one of the pivotal movement sides of the yawing direction.
Figure 19:
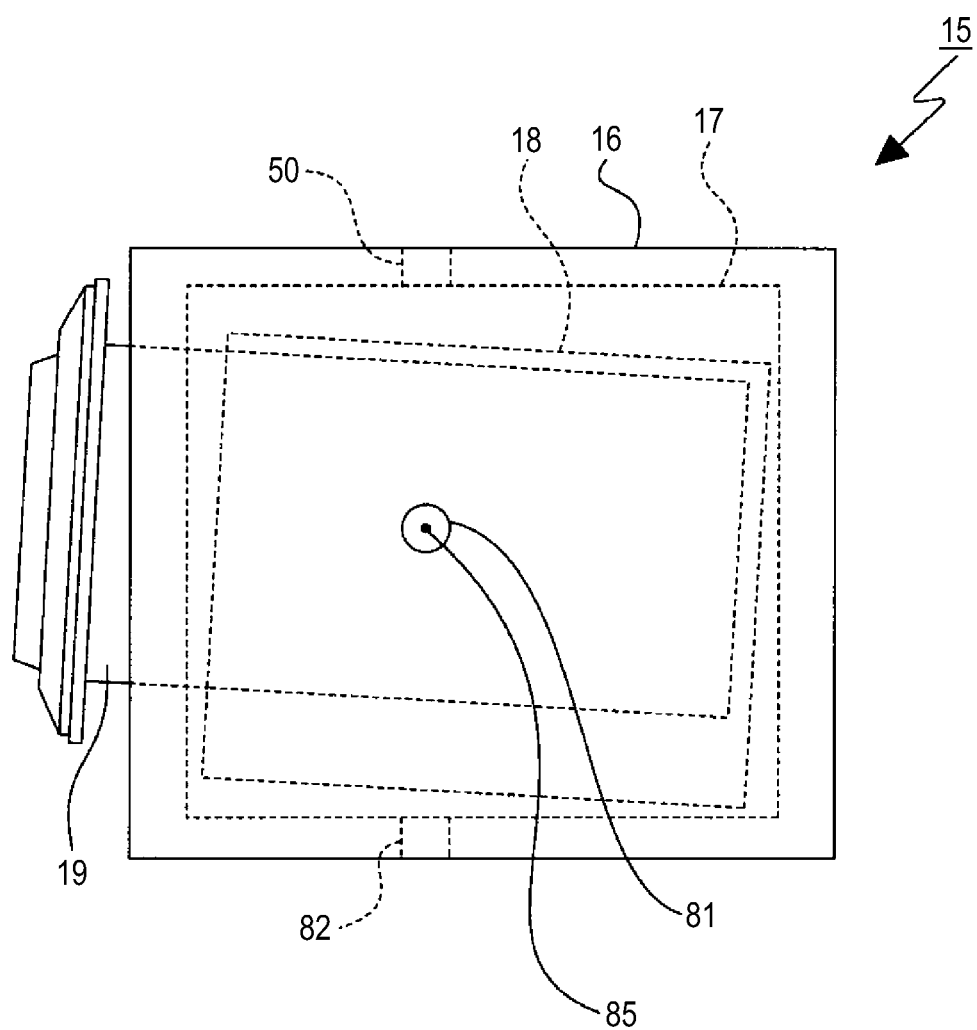
FIG. 19, along with FIG. 20, shows the lens unit having pivoted in the pitching direction and is a schematic plan view showing the lens unit having pivoted in one of the pivotal movement sides of the pitching direction.
Figure 20:
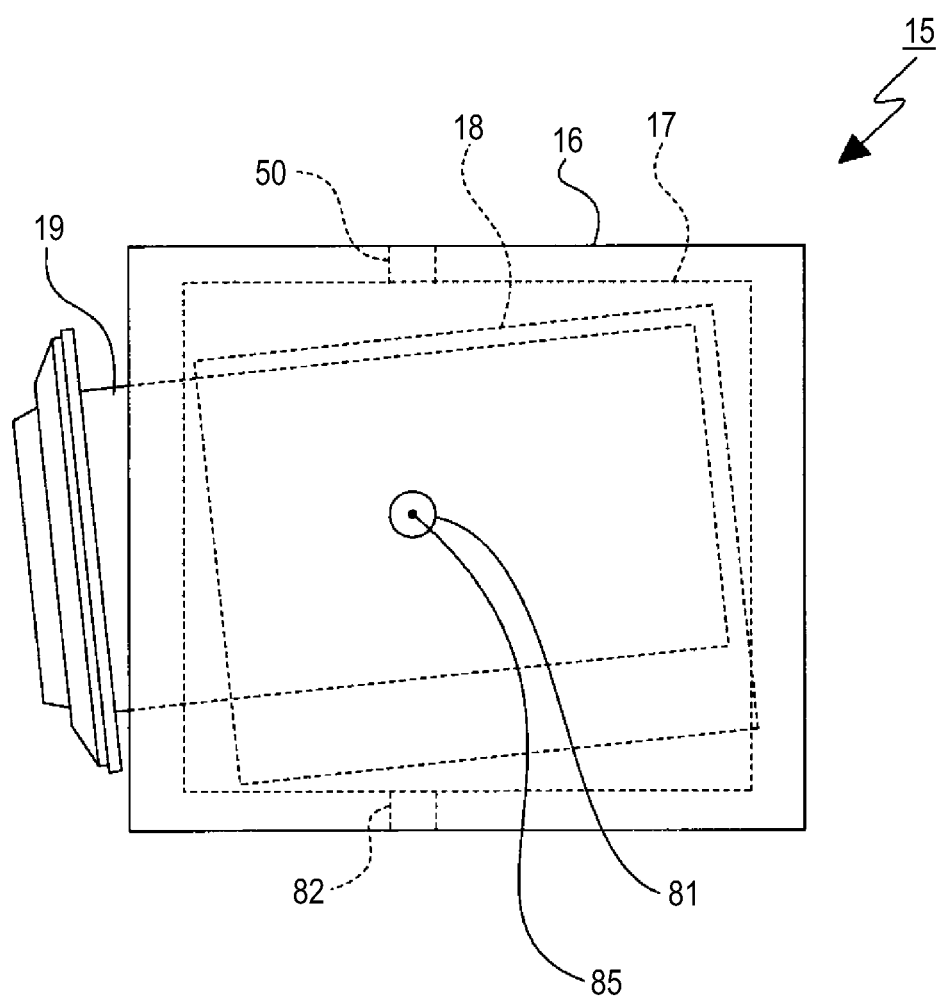
FIG. 20 is a schematic plan view showing the lens unit having pivoted in the other one of the pivotal movement sides of the pitching direction.

The second attachment plate 48 of the first drive motor 44 is attached and fastened to the lower surface of the attachment surface portion 22 of the outer frame 16, for example, with screws (see FIGS. 8 and 16). At this point, the no placement area 54 of the base portion 51 of the coil body 47 is positioned on the left side.

A left end portion of the second attachment plate 48 is attached and fastened to an upper end portion of the second surface-shaped portion 27 of the outer frame 16, for example, with screws. The attachment surface portion 22 and the second surface-shaped portion 27 of the outer frame 16 are therefore connected to each other with the second attachment plate 48 of the first drive motor 44 sandwiched between the portions 22 and 27.

The second shaft holding member 57 for the first drive motor 44 is inserted into the insertion hole 22*a* formed through the attachment surface portion 22 of the outer frame 16 and protrudes upward, and the caulking portion 57*c* of the second shaft holding member 57 is also inserted and disposed in the insertion hole 22*a*. At this point, the caulking portion 49*c* of the first shaft holding member 49 attached to the first attachment plate 45 has been inserted and disposed in the insertion hole 30*a* formed through the attachment surface portion 30 of the inner frame 17. The amount of upward protrusion of the second shaft holding member 57 therefore decreases, whereby the size of the image blur correction unit 15 can be reduced.

The sub-shaft 81 is disposed in the insertion placement hole 27*a* of the second surface-shaped portion 27 of the outer frame 16.

In the image blur correction unit 15 configured as described above, the axis that connects the central axis of the output shaft 50 of the first drive motor 44 to the central axis of the sub-shaft 80 is a first pivotal axis 84, and the axis that connects the central axis of the output shaft 68 of the second drive motor 62 to the central axis of the sub-shaft 81 is a second pivotal axis 85 (see FIG. 8).

[Operation of Image Blur Correction Unit]

Blur correction performed by the image blur correction unit 15 will be described below (see FIGS. 17 to 20).

The lens unit 19 pivots in the yawing direction (first direction) around the first pivotal axis 84 and in the pitching direction (second direction) around the second pivotal axis 85 as follows.

The pivotal motion of the lens unit 19 in the yawing direction is achieved by supplying the coils 52, 52, . . . with current in such a way that the thrust generation portions 52*c*, 52*c*, . . . produce a thrust force acting in a blur correction direction. In this process, the lens unit 19 pivots integrally with the inner frame 17 and the holding frame 18 relative to the outer frame 16 around the first pivotal axis 84 in response to the rotation of the first attachment plate 45, the magnet 46, and the output shaft 50 (see FIGS. 17 and 18).

When the lens unit 19 pivots in the yawing direction, the magnetism detection device 55 detects the rotational position of the magnet 64. The detection of the rotational position of the magnet 64 is achieved when the magnetism detection device 55 detects the change in magnetic flux resulting from the rotation of the magnet 64, and the pivotal position of the lens unit 19 in the yawing direction is detected based on the detection result of the rotational position of the magnet 64. Current is so supplied to the coils 52, 52, . . . that the thrust force generation portions 52*c*, 52*c*, . . . produce a thrust force in a blur correction direction as described above in accordance with the detection result of the rotational position of the magnet 64.

On the other hand, the pivotal motion of the lens unit 19 in the pitching direction is achieved by supplying the coils 70, 70, . . . with current in such a way that the thrust generation portions 70*c*, 70*c*, . . . produce a thrust force in a blur correction direction. In this process, the lens unit 19 pivots integrally with the holding frame 18 relative to the outer frame 16 and the inner frame 17 around the second pivotal axis 85 in response to the rotation of the first attachment plate 63, the magnet 64, and the output shaft 68 (see FIGS. 19 and 20).

When the lens unit 19 pivots in the pitching direction, the magnetism detection device 73 detects the rotational position of the magnet 64. The detection of the rotational position of the magnet 64 is achieved when the magnetism detection device 73 detects the change in magnetic flux resulting from the rotation of the magnet 64, and the pivotal position of the lens unit 19 in the pitching direction is detected based on the detection result of the rotational position of the magnet 64. Current is so supplied to the coils 70, 70, . . . that the thrust force generation portions 70*c*, 70*c*, . . . produce a thrust force in a blur correction direction as described above in accordance with the detection result of the rotational position of the magnet 64.

The above description has been made with reference to the case where the lent unit 19 is pivotally supported by the inner frame 17 around the second pivotal axis 85 and the lens unit 19 and the inner frame 17 as a whole are pivotally supported by the outer frame 16 around the first pivotal axis 84.

Conversely, the image blur correction unit 15 can be so configured that the lent unit 19 is pivotally supported by the inner frame 17 around the first pivotal axis 84 and the lens unit 19 and the inner frame 17 as a whole are pivotally supported by the outer frame 16 around the second pivotal axis 85.

To reduce the burden on the output shafts and the sub-shafts, however, the weight that pivots in the pitching direction, in which the lens unit 19 pivots in a substantially up-down direction, is desirably smaller than the weight that pivots in the yawing direction, in which the lens unit 19 pivots in a substantially right-left direction. It is therefore desirable to employ a configuration in which the lens unit 19 is pivotally supported by the inner frame 17 around the first pivotal axis 84 and the lens unit 19 and the inner frame 17 as a whole are pivotally supported by the outer frame 16 around the second pivotal axis 85.

[Variation of Shaft Holding Member]

Figure 21:
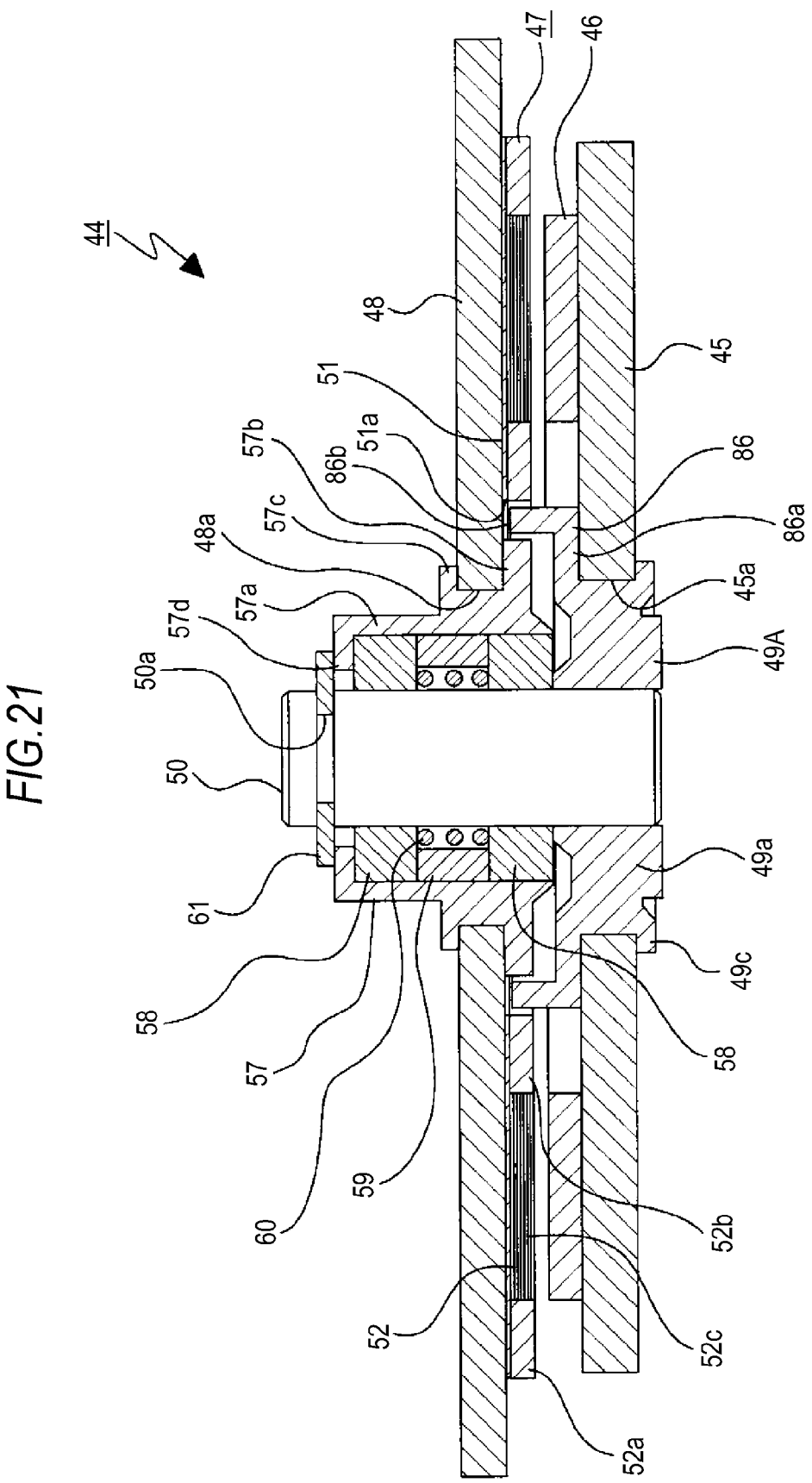
FIG. 21, along with FIG. 22, shows a first variation of the shaft holding members and is an enlarged cross-sectional view.
Figure 22:
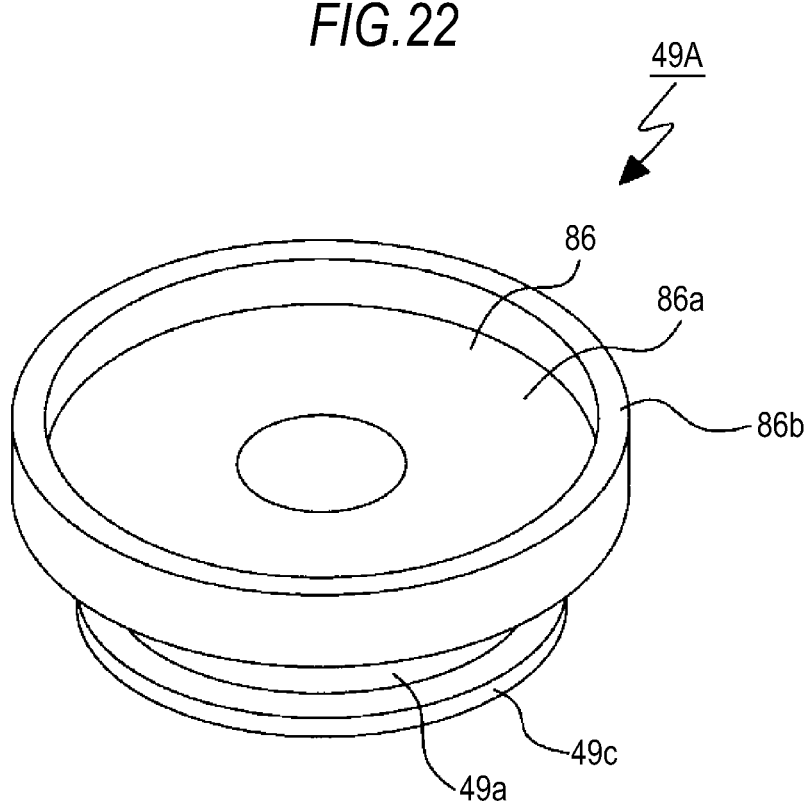
FIG. 22 is an enlarged perspective view.
Figure 23:
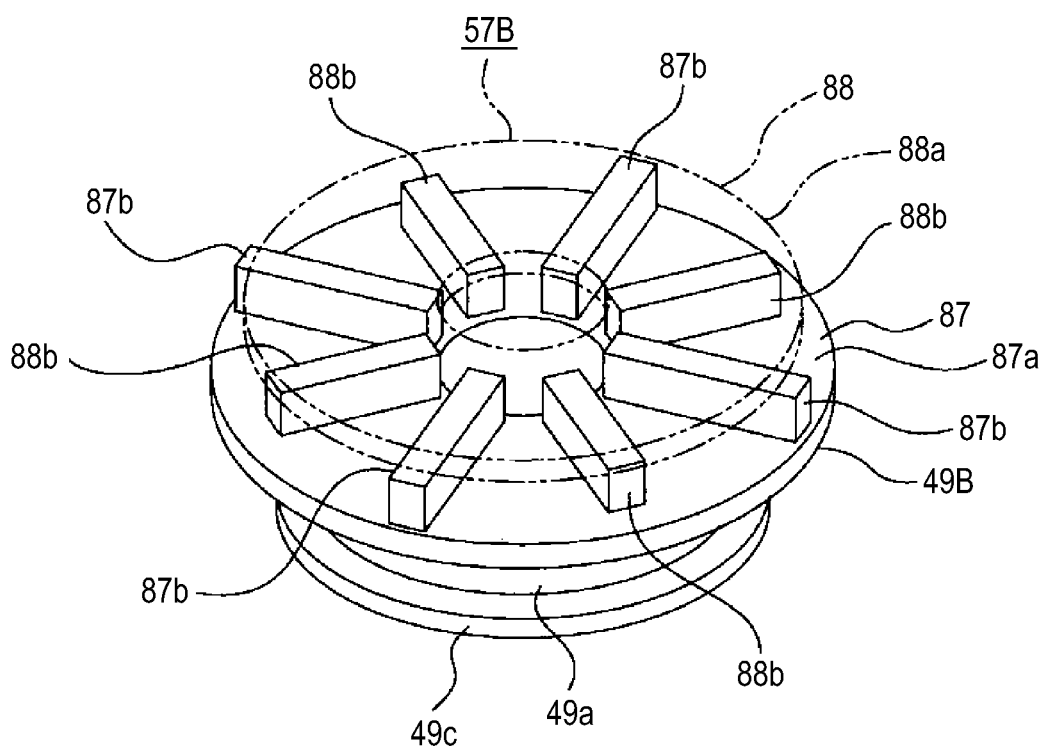
FIG. 23 is an enlarged perspective view showing a second variation of the shaft holding members.

A first variation and a second variation of the shaft holding members will be described below (see FIGS. 21 to 23).

Both the first drive motor 44 and the second drive motor 62 can be provided with shaft holding members according to the variations described below. The following description will be made with reference to a case where the first drive motor 44 is provided by way of example with the shaft holding members according to the variations.

A first shaft holding member 49A according to the first variation has the shaft holding portion 49*a*, a flange portion 86, and the caulking portion 49*c* with the three portions integrated with each other. The flange portion 86 is formed of an overhanging portion 86*a* overhanging outward in the radial direction and a rib 86*b* protruding upward from an outer circumferential portion of the overhanging portion 86*a* (see FIGS. 21 and 22).

A front end portion (upper end portion) of the rib 86*b* and the flange portion 57*b* of the second shaft holding member 57 are located side by side in the radial direction and overlap with each other.

Since the flange portion 86 of the first shaft holding member 49A has the rib 86*b* as described above, the first shaft holding member 49A is fixed to the first attachment plate 45 at a greater strength, which prevents inclination of the first attachment plate 45 due to the magnetic force (attractive force) of the magnet 46, whereby the drive force of the first drive motor 44 can be improved.

Further, since the first shaft holding member 49A is fixed at a greater strength, the thickness of the flange portion 86 can be reduced accordingly, and the distance between the first attachment plate 45 and the second attachment plate 48 can be reduced by the reduced thickness of the flange portion 86, whereby the thickness of the first drive motor 44 can be reduced.

The above description has been made with reference to the case where the first shaft holding member 49A is provided with the rib 86*b* but the shape of the second shaft holding member 57 is not changed. Conversely, the second shaft holding member may be provided with a rib but the shape of the first shaft holding member 49 may not be changed. In this case, the rib provided on the second shaft holding member and the flange portion 49*b* of the first shaft holding member 49 overlap with each other.

A first shaft holding member 49B according to the second variation has the shaft holding portion 49*a*, a flange portion 87, and the caulking portion 49*c* with the three portions integrated with each other. The flange portion 87 is formed of an overhanging portion 87*a* overhanging outward in the radial direction and ribs 87*b*, 87*b*, . . . protruding upward from the overhanging portion 87*a* (see FIG. 23). The ribs 87*b*, 87*b*, . . . extend in the radial direction and are located in separate positions in the circumferential direction.

A second shaft holding member 57B according to the second variation has the shaft holding portion 57*a*, a flange portion 88, and the caulking portion 57*c* with the three portions integrated with each other. The flange portion 88 is formed of an overhanging portion 88*a* overhanging outward in the radial direction and ribs 88*b*, 88*b*, . . . protruding downward from the overhanging portion 88*a*. The ribs 88*b*, 88b, . . . extend in the radial direction and located in separate positions in the circumferential direction.

Front end portions (upper end portions) of the ribs 87b, 87b, . . . of the first shaft holding member 49B and front end portions (lower end portions) of the ribs 88b, 88b, . . . of the second shaft holding member 57B are located side by side in the circumferential direction and overlap with each other.

Since the flange portion 87 of the first shaft holding member 49B has the ribs 87b, 87b, . . . and the flange portion 88 of the second shaft holding member 57B has the ribs 88b, 88b, . . . as described above, the first shaft holding member 49B can be fixed to the first attachment plate 45 and the second shaft holding member 57B can be fixed to the second attachment plate 48 at greater strengths.

The increased strengths prevent inclination of the first attachment plate 45 and the second attachment plate 48 due to the magnetic force (attractive force) of the magnet 46, whereby the drive force of the first drive motor 44 can be improved.

Further, since the first shaft holding member 49B and the second shaft holding member 57B are fixed by greater strengths, the thicknesses of the flange portion 87 and the flange portion 88 can be reduced accordingly.

As a result, the distance between the first attachment plate 45 and the second attachment plate 48 can be reduced by the reduced thicknesses of the flange portion 87 and the flange portion 88, whereby the thickness of the first drive motor 44 can be reduced.

[Embodiment of Imaging Apparatus]

FIG. 24 is a block diagram of a video camcorder as the imaging apparatus according to the embodiment of the present technology.

An imaging apparatus (video camcorder) 100 (corresponding to imaging apparatus 1) includes a lens unit 101 (corresponding to lens unit 19) responsible for image capturing, a camera signal processor 102 that performs signal processing, such as conversion of an analog captured image signal into a digital image signal, and an image processor 103 that records and reproduces the resultant image signal. The imaging apparatus 100 further includes an image display 104 (corresponding to display section 13), such as a liquid crystal panel, for displaying a captured image and other information, a R/W (reader/writer) 105 that writes and reads an image signal to and from a memory card 1000 (corresponding to memory card 9), a CPU (central processing unit) 106 that controls the entire imaging apparatus 100, an input unit 107 formed of a variety of switches and other components operated by a user as necessary (corresponding to operation switches 7, operation buttons 8, operation buttons 10, and operation unit 17), and a lens drive controller 108 that controls driving of lenses disposed in the lens unit 101.

The lens unit 101 is formed of an optical system including a lens group 109 (corresponding to lens group provided in lens unit 19), an imaging device 110 (corresponding to imaging device provided in imaging unit 42), such as a CCD (charge coupled device) and a CMOS (complementary metal-oxide semiconductor) device, and other components.

The camera single processor 102 converts an output signal from the imaging device 110 into a digital signal, performs noise removal and image quality correction, converts the digital signal into brightness/color difference signals, and performs other types of signal processing.

The image processor 103 performs compression encoding and decompression decoding on an image signal based on a predetermined image data format, performs data specification conversion, such as resolution conversion, and performs other types of image processing.

The image display 104 has a function of displaying a variety of data, such as user's operation through the input unit 107 and captured images.

The R/W 105 writes image data encoded by the image processor 103 to the memory card 1000 and reads image data recorded on the memory card 1000.

The CPU 106 functions as a control processor that controls circuit blocks provided in the imaging apparatus 100 and controls each of the circuit blocks based, for example, on an instruction input signal from the input unit 107.

The input unit 107 is formed, for example, of a shutter release button for shutter operation and a selection switch for selecting an action mode and outputs an instruction input signal according to user's operation to the CPU 106.

The lens drive controller 108 controls a motor or any other actuator (not shown) that drives lenses in the lens group 109 based on a control signal from the CPU 106.

The memory card 1000 is, for example, a semiconductor memory that can be attached and detached to and from a slot connected to the R/W 105.

The operation of the imaging apparatus 100 will be described below.

In an image capturing standby state, an image signal captured by the lens unit 101 is outputted to the image display 104 via the camera single processor 102 and displayed as camera-through images on the image display 104 under the control of the CPU 106. When a zooming instruction input signal is inputted from the input unit 107, the CPU 106 outputs a control signal to the lens drive controller 108, and a predetermined lens in the lens group 109 is moved under the control of the lens drive controller 108.

When a shutter (not shown) in the lens unit 101 is operated in response to an instruction input signal from the input unit 107, the camera signal processor 102 outputs a captured image signal to the image processor 103, which performs compression encoding on the image signal and converts the encoded image signal into digital data expressed in a predetermined data format. The converted data is outputted to the R/W 105, which writes the data onto the memory card 1000.

Focusing and zooming are carried out as follows: The lens drive controller 108 moves a predetermined lens in the lens group 109 based on a control signal from the CPU 106.

To reproduce image data recorded on the memory card 1000, predetermined image data is read from the memory card 1000 through the R/W 105 in response to user's operation performed through the input unit 107. The image processor 103 performs decompression decoding on the read image data, and an image signal to be reproduced is then outputted to the image display 104 and displayed as reproduced images.

[Brief]

As described above, in the first drive motor 44 and the second drive motor 62, the flange portions 49b and 67b of the first shaft holding members 49 and 67 and the flange portions 57b and 75b of the second shaft holding members 57 and 75 are located on the side of the first attachment plates 45 and 63 and the second attachment plates 48 and 66 where the magnets 46 and 64 and the coil bodies 47 and 65 are disposed.

The configuration described above increases forces against the magnetic forces (attractive forces) produced by the magnets 46 and 64 and acting in the direction in which the first attachment plates 45, 63 and the second attachment plates 48, 66 approach each other. That is, forces that press the first attachment plates 45 and 63 and the second attachment plates 48 and 66 from the side where the flange portions 49b, 67b, 57b, and 75b are present toward the side where the caulking portions 49c, 67c, 57c, and 75c are present increase, whereby the strengths of the first shaft holding members 49 and 67 and the second shaft holding members 57 and 75 and hence the drive forces of the first drive motor 44 and the second drive motor 62 can be improved.

Further, the caulking portions 49c, 57c, 67c, and 75c of the first shaft holding member 49, the second shaft holding member 57, the first shaft holding member 67, and the second shaft holding member 75 are inserted and disposed in the insertion holes 30a, 22a, 37a, and 31a of the attachment surface portions 30, 22, 37, and 31.

The sizes of the insertion holes 30a, 22a, 37a, and 31a can therefore be minimized, and leakage magnetic fluxes in the first drive motor 44 and the second drive motor 62 that pass through the insertion holes 30a, 22a, 37a, and 31a decrease accordingly, whereby the drive forces of the first drive motor 44 and the second drive motor 62 can be improved.

Moreover, since each of the attachment surface portions 30, 22, 37, and 31 works as a yoke, the leakage magnetic fluxes in the first drive motor 44 and the second drive motor 62 decrease, whereby the drive forces of the first drive motor 44 and the second drive motor 62 can be further improved.

Further, the outer diameters of the flange portions 49b and 67b of the first shaft holding members 49 and 67 are set to be greater than the outer diameters of the flange portions 57b and 75b of the second shaft holding members 57 and 75.

As a result, the spaces between the first attachment plates 45, 63 and the second attachment plates 48, 66 can be effectively used, whereby the strengths of the first shaft holding members 49 and 67 can be improved while the size reduction of the drive motor resulting from the effective use of the spaces is achieved at the same time.

Further, the outer circumferential portions of the flange portions 49b and 67b of the first shaft holding members 49 and 67 and the inner circumferential portions 52b, 52b, . . . and 70b, 70b, . . . of the coils 52, 52, . . . and 70, 70, . . . are arranged side by side in the axial direction of the output shafts 50 and 68, respectively.

As a result, the spaces between the first attachment plates 45, 63 and the second attachment plates 48, 66 can be used in the most effective manner, whereby the strengths of the first shaft holding members 49 and 67 and the second shaft holding members 57 and 75 can be further improved while the size reduction of the drive motor resulting from the effective use of the spaces is achieved at the same time.

In addition, in the first shaft holding members 49 and 67 and the second shaft holding members 57 and 75, the outer diameters of the flange portions 49b, 67b, 57b, and 75b are set to be greater than the outer diameters of the caulking portions 49c, 67c, 57c, and 75c.

Forces that press the first attachment plates 45 and 63 and the second attachment plates 48 and 66, to which forces in the direction in which the attachment plates approach each other are applied, in the direction against the forces acting in the direction in which the attachment plates approach each other increase, whereby the strengths of the first shaft holding members 49 and 67 and the second shaft holding members 57 and 75 can be improved.

Alternatively, in each of the first drive motor 44 and the second drive motor 62, part of the flange portion of the first shaft holding member and part of the flange portion of the second shaft holding member can be located side by side in the radial direction and the axial direction and overlap with each other in the radial direction and the axial direction.

The present technology can also be configured as follows.

(1) A drive motor including an output shaft provided as an axis of rotation, a first attachment plate having a first fixing hole, a second attachment plate having a second fixing hole and located in a position separate from the first attachment plate in an axial direction of the output shaft, a magnet attached to one surface of the first attachment plate, a coil attached to one surface of the second attachment plate and facing the magnet, a first shaft holding member that is inserted into the first fixing hole and fixed to the first attachment plate and holds the output shaft, and a second shaft holding member that is inserted into the second fixing hole and fixed to the second attachment plate and holds the output shaft, wherein each of the first shaft holding member and the second shaft holding member is provided with a flange portion that presses an inner circumferential portion of the one surface of the corresponding one of the first attachment plate and the second attachment plate and a caulking portion that is formed in a caulking process and presses an inner circumferential portion of the other surface of the corresponding one of the first attachment plate and the second attachment plate.

(2) The drive motor described in (1), wherein an attachment surface portion to which at least one of the first attachment plate and the second attachment plate is so attached that the other surface is in contact with the attachment surface portion is provided, and the attachment surface portion has an insertion hole in which the caulking portion of the corresponding one of the first shaft holding member and the second shaft holding member is inserted and disposed.

(3) The drive motor described in (2), wherein the attachment surface portion is provided as a yoke.

(4) The drive motor described in any of (1) to (3), wherein a rib protruding in the axial direction is provided on at least one of the flange portions.

(5) The drive motor described in (4), wherein at least a front end portion of the rib provided on at least one of the first shaft holding member and the second shaft holding member and part of the second shaft holding member or the first shaft holding member are located side by side in a direction perpendicular to the axial direction.

(6) The drive motor described in any of (1) to (5), wherein the outer diameter of the flange portion of the first shaft holding member is set to be greater than the outer diameter of the flange portion of the second shaft holding member.

(7) The drive motor described in (6), wherein an outer circumferential portion of the flange portion of the first shaft holding member and part of the coil are located side by side in the axial direction.

(8) The drive motor described in any of (1) to (7), wherein the outer diameter of each of the flange portions is set to be greater than the outer diameter of the corresponding one of the caulking portions.

(9) An image blur correction unit including a lens unit having at least one lens and pivotable relative to an exterior enclosure in two directions perpendicular not only to an optical axis of the lens but also to each other and a drive motor that causes the lens unit to pivot, wherein the drive motor includes an output shaft provided as an axis of rotation, a first attachment plate having a first fixing hole, a second attachment plate having a second fixing hole and located in a position separate from the first attachment plate in an axial direction of the output shaft, a magnet attached to one surface of the first attachment plate, a coil attached to one surface of the second attachment plate and facing the magnet, a first shaft holding member that is inserted into the first fixing hole and fixed to the first attachment plate and holds the output shaft, and a second shaft holding member that is inserted into the second fixing hole and fixed to the second attachment plate and holds the output shaft, and each of the first shaft holding member and the second shaft holding member is provided with a flange portion that presses an inner circumferential portion of the one surface of the corresponding one of the first attachment plate and the second attachment plate and a caulking portion that is formed in a caulking process and presses an inner circumferential portion of the other surface of the corresponding one of the first attachment plate and the second attachment plate.

(10) An imaging apparatus including an image blur correction unit having a lens unit that has at least one lens and an exterior enclosure that accommodates the lens unit, corrects an image blur by using the lens unit that is pivotable relative to the exterior enclosure in two directions perpendicular not only to an optical axis of the lens but also to each other, and has a drive motor that causes the lens unit to pivot, wherein the drive motor includes an output shaft provided as an axis of rotation, a first attachment plate having a first fixing hole, a second attachment plate having a second fixing hole and located in a position separate from the first attachment plate in an axial direction of the output shaft, a magnet attached to one surface of the first attachment plate, a coil attached to one surface of the second attachment plate and facing the magnet, a first shaft holding member that is inserted into the first fixing hole and fixed to the first attachment plate and holds the output shaft, and a second shaft holding member that is inserted into the second fixing hole and fixed to the second attachment plate and holds the output shaft, and each of the first shaft holding member and the second shaft holding member is provided with a flange portion that presses an inner circumferential portion of the one surface of the corresponding one of the first attachment plate and the second attachment plate and a caulking portion that is formed in a caulking process and presses an inner circumferential portion of the other surface of the corresponding one of the first attachment plate and the second attachment plate. The specific shapes and structures of the parts shown in the best mode described above are all presented only by way of example for implementing the present technology and should not be used to construe the technical extent of the present technology in a limited sense.

The present disclosure contains subject matter related to that disclosed in Japanese Priority Patent Application JP 2012-044278 filed in the Japan Patent Office on Feb. 29, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A drive motor comprising:
an output shaft provided as an axis of rotation;
a first attachment plate having a first fixing hole;
a second attachment plate having a second fixing hole and located in a position separate from the first attachment plate in an axial direction of the output shaft;
a magnet attached to one surface of the first attachment plate;
a coil attached to one surface of the second attachment plate and facing the magnet;
a first shaft holding member that is inserted into the first fixing hole and fixed to the first attachment plate and holds the output shaft; and
a second shaft holding member that is inserted into the second fixing hole and fixed to the second attachment plate and holds the output shaft,
wherein each of the first shaft holding member and the second shaft holding member is provided with a flange portion that presses an inner circumferential portion of the one surface of the corresponding one of the first attachment plate and the second attachment plate and a caulking portion that is formed in a caulking process and presses an inner circumferential portion of the other surface of the corresponding one of the first attachment plate and the second attachment plate.

2. The drive motor according to claim 1,
wherein an attachment surface portion to which at least one of the first attachment plate and the second attachment plate is so attached that the other surface is in contact with the attachment surface portion is provided, and
the attachment surface portion has an insertion hole in which the caulking portion of the corresponding one of the first shaft holding member and the second shaft holding member is inserted and disposed.

3. The drive motor according to claim 2,
wherein the attachment surface portion is provided as a yoke.

4. The drive motor described according to claim 1,
wherein a rib protruding in the axial direction is provided on at least one of the flange portions.

5. The drive motor according to claim 4,
wherein at least a front end portion of the rib provided on at least one of the first shaft holding member and the second shaft holding member and part of the second shaft holding member or the first shaft holding member are located side by side in a direction perpendicular to the axial direction.

6. The drive motor according to claim 1,
wherein the outer diameter of the flange portion of the first shaft holding member is set to be greater than the outer diameter of the flange portion of the second shaft holding member.

7. The drive motor according to claim 6,
wherein an outer circumferential portion of the flange portion of the first shaft holding member and part of the coil are located side by side in the axial direction.

8. The drive motor according to claim 1,
wherein the outer diameter of each of the flange portions is set to be greater than the outer diameter of the corresponding one of the caulking portions.

9. An image blur correction unit comprising:
a lens unit having at least one lens and pivotable relative to an exterior enclosure in two directions perpendicular not only to an optical axis of the lens but also to each other; and
a drive motor that causes the lens unit to pivot,
wherein the drive motor includes
an output shaft provided as an axis of rotation,
a first attachment plate having a first fixing hole,
a second attachment plate having a second fixing hole and located in a position separate from the first attachment plate in an axial direction of the output shaft,
a magnet attached to one surface of the first attachment plate,
a coil attached to one surface of the second attachment plate and facing the magnet,
a first shaft holding member that is inserted into the first fixing hole and fixed to the first attachment plate and holds the output shaft, and
a second shaft holding member that is inserted into the second fixing hole and fixed to the second attachment plate and holds the output shaft, and
each of the first shaft holding member and the second shaft holding member is provided with a flange portion that presses an inner circumferential portion of the one surface of the corresponding one of the first attachment plate and the second attachment plate and a caulking portion that is formed in a caulking process and presses an inner circumferential portion of the other surface of the corresponding one of the first attachment plate and the second attachment plate.

10. An imaging apparatus comprising:

an image blur correction unit having a lens unit that has at least one lens and an exterior enclosure that accommodates the lens unit, corrects an image blur by using the lens unit that is pivotable relative to the exterior enclosure in two directions perpendicular not only to an optical axis of the lens but also to each other, and has a drive motor that causes the lens unit to pivot, wherein the drive motor includes an output shaft provided as an axis of rotation, a first attachment plate having a first fixing hole, a second attachment plate having a second fixing hole and located in a position separate from the first attachment plate in an axial direction of the output shaft, a magnet attached to one surface of the first attachment plate, a coil attached to one surface of the second attachment plate and facing the magnet, a first shaft holding member that is inserted into the first fixing hole and fixed to the first attachment plate and holds the output shaft, and a second shaft holding member that is inserted into the second fixing hole and fixed to the second attachment plate and holds the output shaft, and each of the first shaft holding member and the second shaft holding member is provided with a flange portion that presses an inner circumferential portion of the one surface of the corresponding one of the first attachment plate and the second attachment plate and a caulking portion that is formed in a caulking process and presses an inner circumferential portion of the other surface of the corresponding one of the first attachment plate and the second attachment plate.

* * * * *